(12) United States Patent
Wagner

(10) Patent No.: US 12,703,105 B2
(45) Date of Patent: Aug. 11, 2026

(54) AUTOMATED GRIPPING TOOL

(71) Applicant: JLS Automation, York, PA (US)

(72) Inventor: Corey Wagner, Glen Rock, PA (US)

(73) Assignee: JLS Automation, York, PA (US)

( * ) Notice: Subject to any disclaimer, the term of this patent is extended or adjusted under 35 U.S.C. 154(b) by 1016 days.

(21) Appl. No.: 17/752,982

(22) Filed: May 25, 2022

(65) Prior Publication Data

US 2022/0379487 A1 Dec. 1, 2022

Related U.S. Application Data

(60) Provisional application No. 63/194,296, filed on May 28, 2021.

(51) Int. Cl.

| | |
|---|---|
| ***B25J 15/02*** | (2006.01) |
| ***B25J 11/00*** | (2006.01) |
| ***B65G 47/49*** | (2006.01) |
| ***B65G 47/90*** | (2006.01) |

(52) U.S. Cl.

CPC ....... *B25J 11/0045* (2013.01); *B25J 15/0206* (2013.01); *B65G 47/904* (2013.01); *B65G 2201/0202* (2013.01)

(58) Field of Classification Search

CPC . B25J 11/0045; B25J 15/0206; B65G 47/904; B65G 2201/0202

USPC .................................. 294/198, 86.29, 87.22

See application file for complete search history.

(56) References Cited

U.S. PATENT DOCUMENTS

| | | | | |
|---|---|---|---|---|
| 4,529,182 | A * | 7/1985 | Valentine | B25B 5/064 269/157 |
| 4,556,360 | A * | 12/1985 | Hoffmann | B23Q 7/008 414/701 |
| 4,696,503 | A * | 9/1987 | Collodel | B25J 15/0273 901/39 |
| 8,414,042 | B2 * | 4/2013 | Landes | B65G 47/90 294/67.31 |
| 9,956,691 | B1 * | 5/2018 | Pentzer | B25J 15/08 |
| 10,105,583 | B2 * | 10/2018 | Deveaux | A63B 71/06 |
| 2010/0133862 | A1 * | 6/2010 | Hawes | B25J 15/12 294/2 |
| 2010/0225132 | A1 * | 9/2010 | Weber | B25J 15/0014 294/67.33 |
| 2020/0122338 | A1 * | 4/2020 | Pedersen | B25J 15/0014 |
| 2021/0402618 | A1 * | 12/2021 | Wagner | B25J 15/0061 |
| 2023/0020113 | A1 * | 1/2023 | Powell | B25J 15/0014 |
| 2024/0317435 | A1 * | 9/2024 | Wagner | B65B 35/36 |

* cited by examiner

*Primary Examiner* — Paul T Chin

(74) *Attorney, Agent, or Firm* — Barley Snyder

(57) ABSTRACT

The automated gripping tool enables a user to move a food product from a first position to a second position while maintaining the integrity and appearance of the food product. The automated gripping tool makes use of flexible gripping elements on the ends of banks of opposing pairs of gripping arms. The flexible gripping elements are positioned to cradle a stacked food product between them with sufficient force to allow the food product to be repositioned and without damaging the integrity of the food product.

18 Claims, 18 Drawing Sheets

10

74
9
50
62
60
62
9
56
48
46
48
44
44
30
10

160
162
150
70
z
x
115
146
90
142
66
50
48
48
12
12
30
20

AUTOMATED GRIPPING TOOL

CROSS-REFERENCE TO RELATED APPLICATION

This application claims the benefit of U.S. Provisional Patent Application No. 63/194,296, filed on May 28, 2021.

FIELD OF THE INVENTION

The field of the invention is directed to a tool for manipulating materials and, more particularly, an automated gripping tool for manipulating stacked food product, such as stacks of taco shells.

BACKGROUND

Increasingly, industries of all types are using robotic techniques for reasons of efficiency, precision, sanitation, and productivity. In the food industry, and particularly in the field of processed foods, robotics are of use in moving foods from one part of a production stream to another and ultimately into suitable packaging.

However, known robotic tools have proved inadequate to the handling of stacked food products that are composed of individual food items that reside at least partially with one inside another, and assembled in various quantities to form a stack which would benefit by automated processing to move the stacked food product during the manufacture process, or placed into position for packaging. Such stacked food products are often fragile, often having been baked or fried to provide a crispy texture, and thus susceptible to breakage due to improper handling. For example, a plurality of hard taco shells may be provided in stacked form, with at least a portion of one hard taco shell supported within another and assembled into a stack of suitable quantity as desired for processing and/or packaging. Known food handling devices have not provided sufficiently delicate handling to manipulate and maneuver fragile stacked food products, which results in wasted product and increased costs to the manufacturer.

SUMMARY

The present invention permits the handling of food products, especially the movement of fragile stacked food products from a final production stage to a packaging stage, in a way that maintains the integrity and configuration of the stacked food product.

Accordingly, an exemplary embodiment of the automated gripping tool for grasping a food product is provided and includes a pivoting unit; a frame supporting the pivoting unit; and a plurality of corresponding gripping arms mechanically secured to the pivoting unit, and positioned apart to provide a food product receiving space, each of the corresponding gripping arms having: a hinging unit having a first hinge arm and a second hinge arm connected by a pin that is positioned about a pivot point of the hinge; a first support arm connected to one end of the first hinge arm and extending away from the first hinge arm; a second support arm connected to an end of the second hinge arm and extending away from the second hinge arm; a first flexible gripping element positioned between and secured to the first support arm for the plurality of corresponding gripping arms; and a second flexible gripping element positioned between and secured to the second support arm for the plurality of corresponding gripping arms.

In an embodiment, the first flexible gripping element and the second flexible gripping element are a resilient material selected from rubber, silicon, polyurethane, and combinations thereof, and may be provided as a bar shaped material having a rectangular cross-section profile. The flexible gripping elements may be removably attached and extend between a a bank of corresponding gripping arms on one side of the food product receiving space, and the other flexible gripping element may be removably attached and extend between the other bank of corresponding gripping arms on the other side of the food product receiving space.

In an embodiment, each of the corresponding gripping arms may further include a first pneumatic actuator that reversibly rotates the first hinge arm and the second hinge arm, whereby each of the corresponding gripping arms can be selectively moved between an open grip position and a closed grip position.

In an embodiment, at least one of the corresponding gripping arms has a hinging unit positioned with the first hinge arm and the second hinge arm in linear alignment, and may be urged into approximately a 180 degree angle when the first pneumatic actuator is extended.

In an embodiment, at least one of the corresponding gripping arms includes an elevated flange mount on each of the first hinge arm and the second hinge arm, where the corresponding gripping arms are in an end position of the plurality of corresponding gripping arms.

In an embodiment of the automated gripping tool, at least one of the corresponding gripping arms has the first pneumatic actuator spaced away from the first hinge arm and second hinge arm by the elevated flange mount to vertically offset the first pneumatic actuator above the hinging unit, such that when the first pneumatic actuator is extended, the hinging unit can be positioned with the first hinge arm and the second hinge arm overextended at an angle that exceeds 180 degrees. In this manner, a portion of the food receiving space defined between the corresponding gripping arms with the elevated flange mount is less than another portion of the food receiving space between the corresponding gripping arms that lack the elevated flange mount, when the respective first pneumatic actuators are extended. In an embodiment, the first gripping element and the second gripping element are configured to cradle the food product.

In an embodiment, of the automated gripping tool, the pivoting unit includes a pivoting mount supporting the plurality of corresponding gripping arms. The pivoting unit may further include a pivot rod upon which the pivoting mount may rotate, and may further provide a second pneumatic actuator that can controllably effect the rotation of the pivoting mount as the second pneumatic actuator is reversibly actuated. The pivot rod may be extended through the pivoting mount and the frame, such that the pivoting mount can rotate about the pivot rod, and pivot relative to the frame in response to the reversible actuation of the second pneumatic actuator. In an embodiment, the pivoting mount is mechanically secured to the plurality of gripping arms, such that as the pivoting mount is caused to rotate about the pivot rod, the plurality of gripping arms are caused to rotate approximately 90 degrees.

In an embodiment, of the automated gripping tool, the frame is secured to a robotic arm. The plurality of corresponding gripping arms may comprise four pairs of corresponding gripping arms.

BRIEF DESCRIPTION OF THE DRAWINGS

The invention will now be described by way of example with reference to the accompanying figures of which.

DETAILED DESCRIPTION OF THE EMBODIMENT(S)

Referring to FIGS. 1-20, an automated gripping tool 10 according to the invention is shown and used in operation of a food handling and transport system 1, for example, to move a product 20 from one surface to another, particularly from a stage of the production process to a packaging stage. As a representative embodiment of the product 20 depicted in the figures, the product 20 may be a food product, such as a stack of shells, with the system 1 configured to assist in the manufacture of the food product, and may pick up, re-orient, and place the food product in a manner that preserves the integrity of the food product as it is handled. One skilled in the art will recognize that alternative uses for such an automated gripping tool, for example for use with other products, particularly stacked or fragile products, would be apparent and such teachings fall within the spirit of this disclosure.

The food handling and transport system 1 may provide one or more conveyors, and a robotic arm 80 having an end of arm tool in the form of an automated gripping tool 10, with transport movement of the automated gripping tool 10 directed by movements of the robotic arm to direct the gripping tool to pick up, place, and optionally re-orient a food product 20, as may be beneficial in the manufacture and packaging of the food product.

Figure 8:
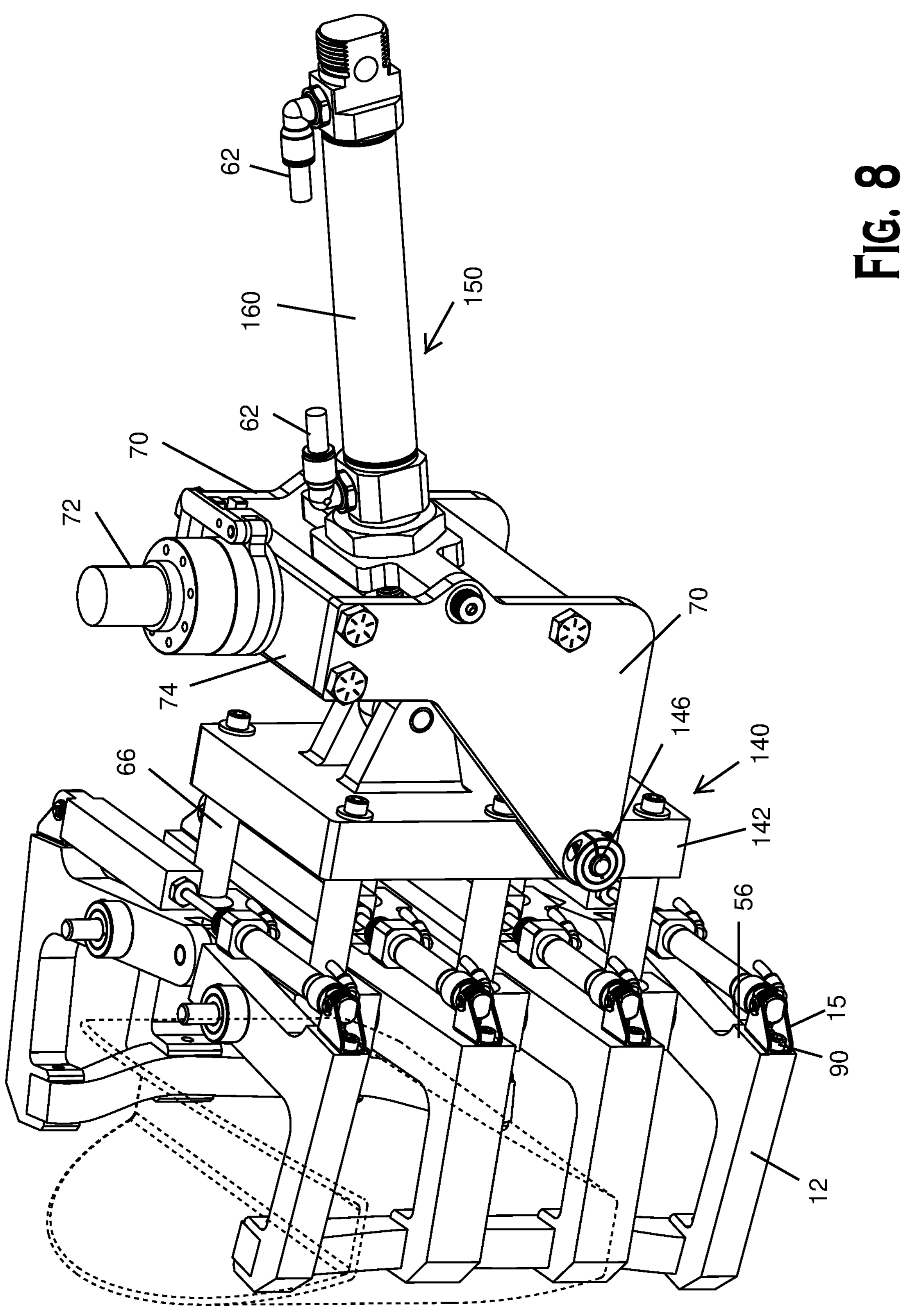
FIG. 8 is a side perspective view of the automated gripping tool of FIG. 7.

An exemplary embodiment of the automated gripping tool 10 is depicted in FIG. 8, and generally includes the following major components: a plurality of gripping arms 12, a pivoting unit 140, and a frame 70.

Figure 19:
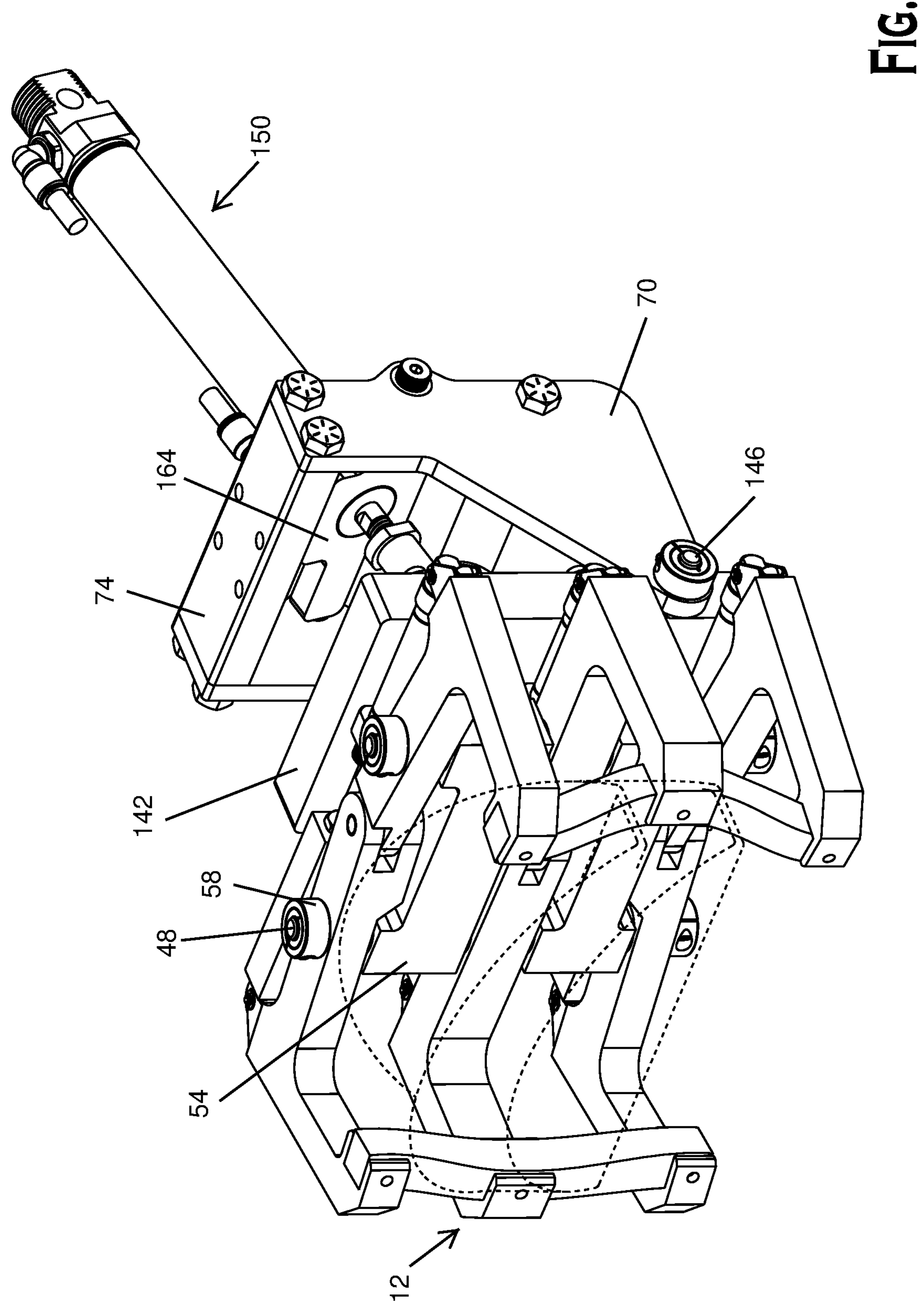
FIG. 19 is a front-side perspective view of another embodiment of the automated gripping tool according to the invention, shown having 3 pairs of gripping arms.
Figure 20:
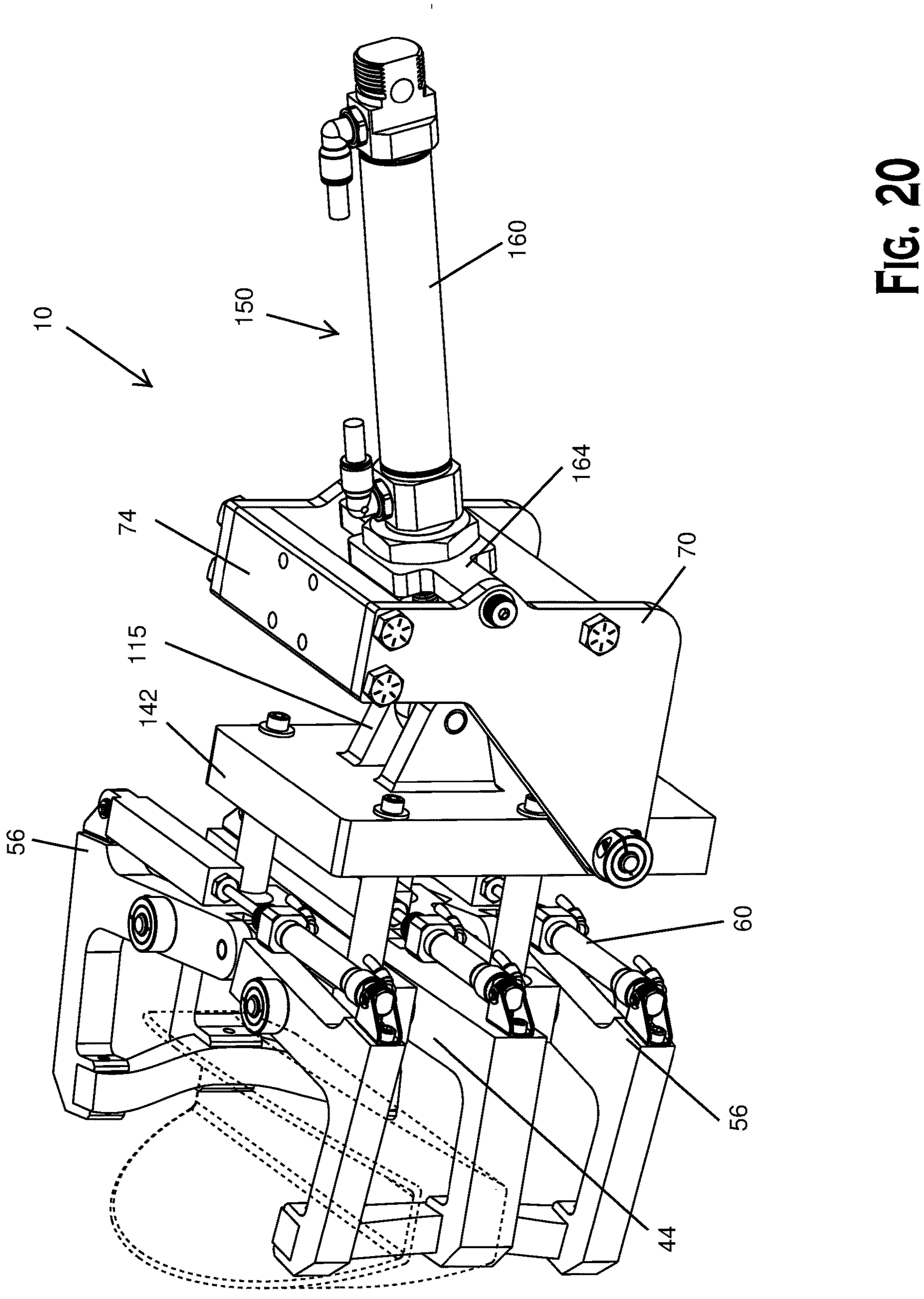
FIG. 20 is a side perspective view of the automated gripping tool of FIG. 19.

With reference to FIGS. 1-18, an embodiment of the automated gripping tool 10 will be described. The plurality of gripping arms 12 provides two or more opposing pairs of gripping arms 12 configured to operate in concert and providing a first bank of gripping arms 12 arranged in opposition to a second bank of gripping arms 12, in order to reversibly grasp a food product from opposite sides, for moving and/or re-orienting the food product, as will be described. The embodiment depicted in FIGS. 1-18, as shown, has four opposing pairs of gripping arms 12, though it is contemplated that the teachings herein would allow one to vary the number of pairs of opposing gripping arms provided, and thus may be adjusted to suit the nature and dimensions of the food product, or other material that is to be grasped, moved and/or re-oriented. An alternative embodiment of the automated gripping tool 10 is depicted in FIGS. 19-20, having three opposing pairs of gripping arms 12, as may be useful for grasping items with smaller dimensions, with remaining components of the automated gripping tool performing similarly.

Figure 6:
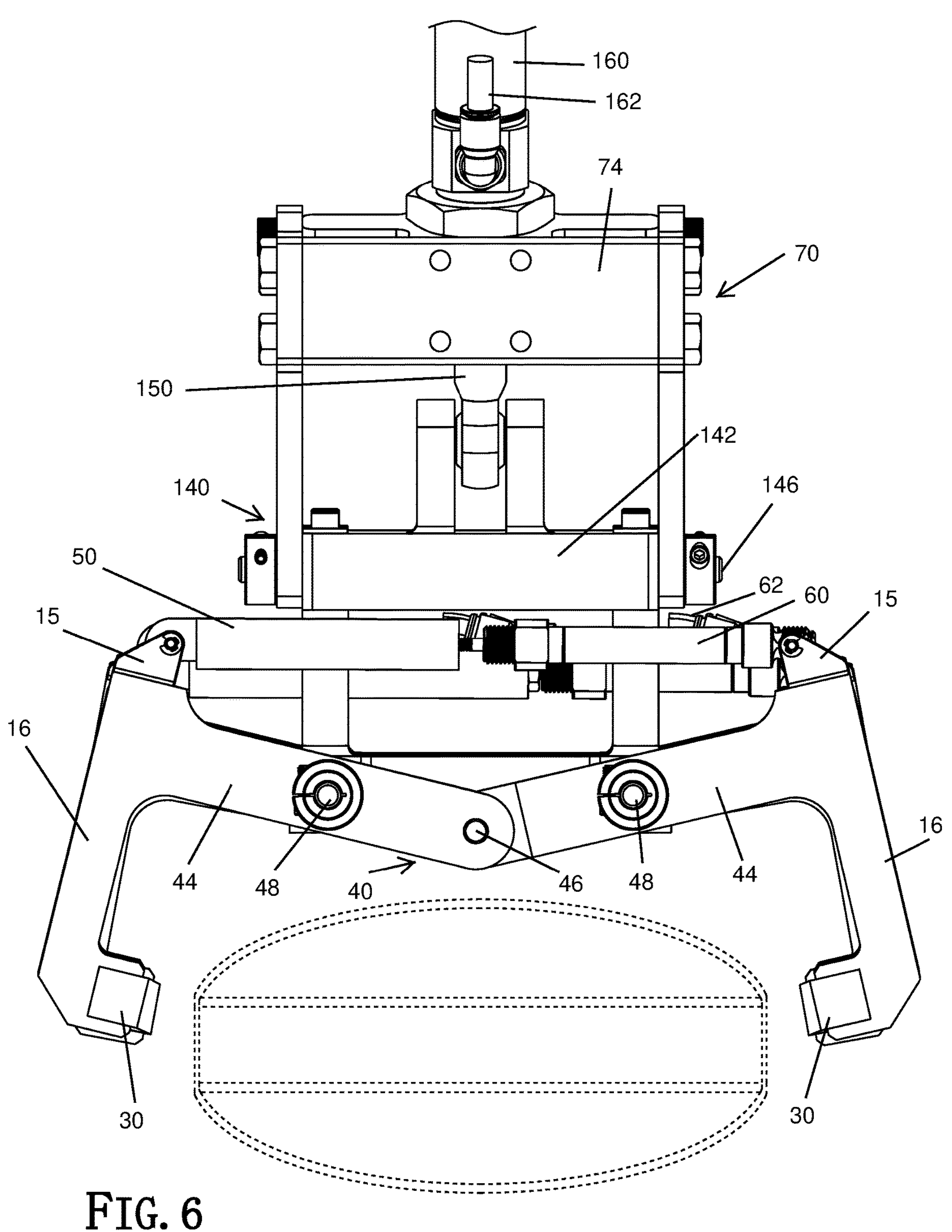
FIG. 6 is a side elevation view of the automated gripping tool of FIG. 3.
Figure 13:
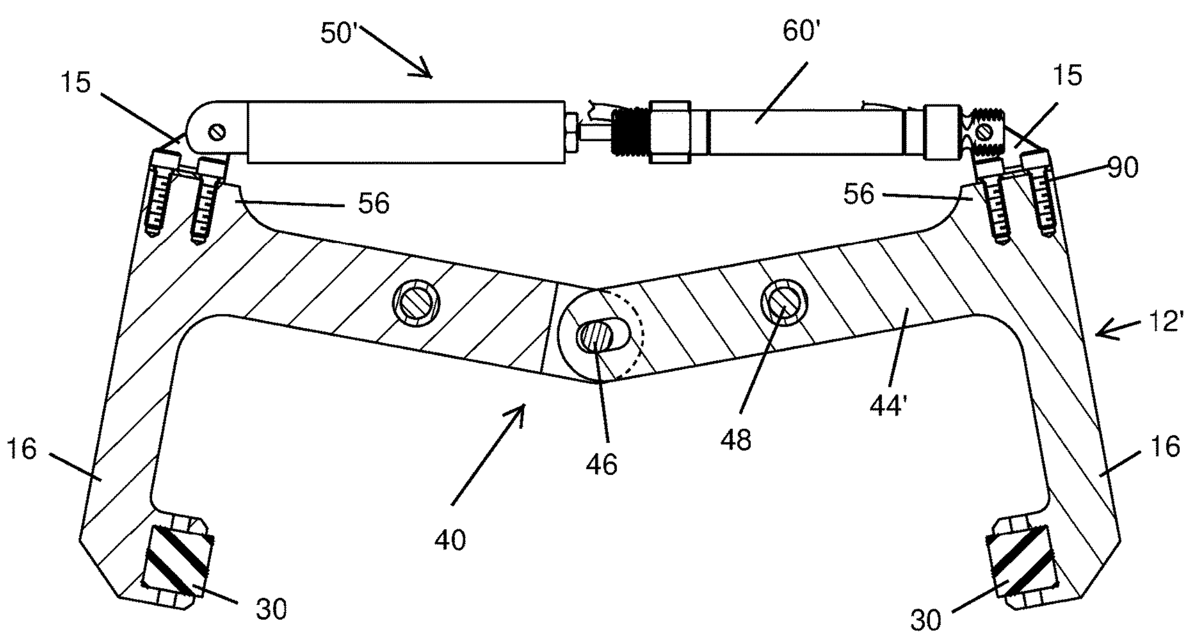
FIG. 13 is a cross-section view of corresponding gripping arms that are located at the end of the plurality of gripping arms for the automated gripping tool of FIG. 4, depicting an open grip position, taken along line 13-13.
Figure 14:
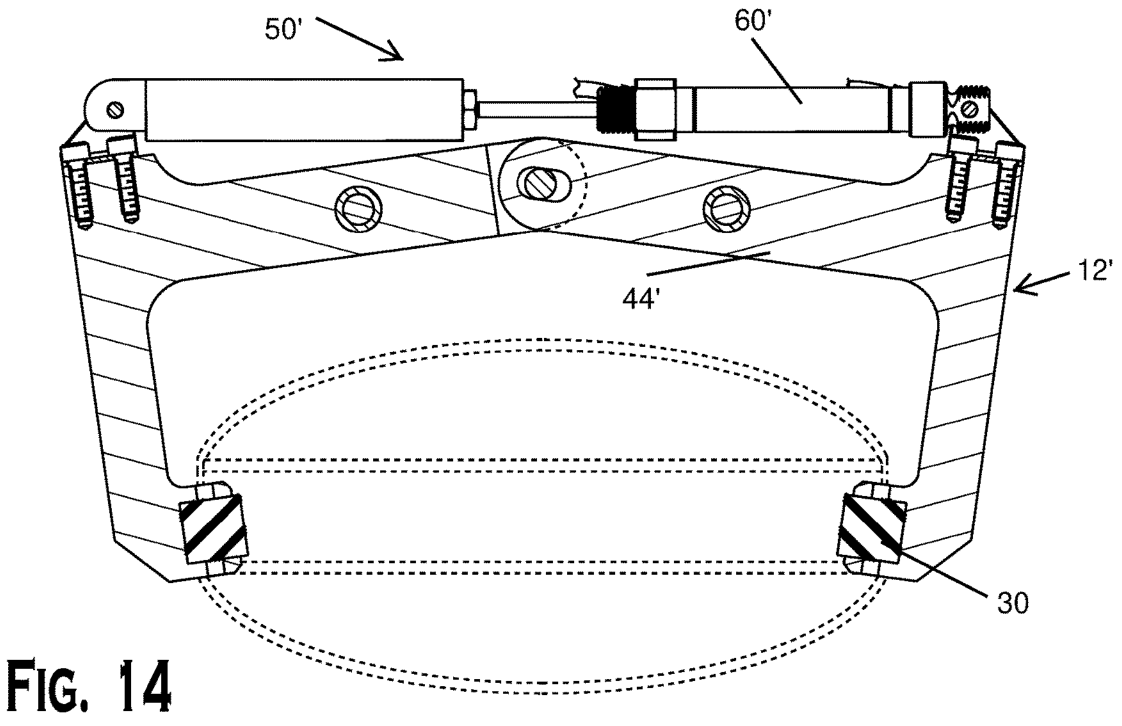
FIG. 14 is a cross-section view of corresponding gripping arms that are located at the end of the plurality of gripping arms for the automated gripping tool of FIG. 5, depicting a closed grip position, taken along line 14-14.

As can be seen specifically with reference to an embodiment of a gripping arm, for example, as depicted in FIG. 6, each corresponding gripping arm 12, together forming an opposing pair, includes a hinge arm 44, a flange 15, and a support arm 16. The hinge arm 44, at one end, is connected to the opposing hinge arm 44 by pin 46, directed through an opening in each of the ends of the opposing hinge arm 44, as shown, to form a hinged connection. In another embodiment of a gripping arm, the hinge pin 46 may be directed through a slotted opening provided in each hinge arm 44, as depicted in FIGS. 13 and 14, in order to provide clearance as the hinge arms 44' are caused to move relative to each other, as such a slotted opening allows opposing pairs of gripping arms to move a small amount laterally, independent of each other. Alternatively, an opening that fits securely and pivotably around the hinge pin 46 without the additional clearance in the form of a slot may be provided, as shown in FIG. 6. At approximately a mid-point along the length of the hinge arm 44, a linking pivot rod 48, is directed through each of the hinge arms 44 in each bank of the gripping arms 12. The support arm 16 is mechanically secured at one end to the outside end of the hinge arm 44, away from the pin 46. The flange 15 is positioned near the outside end of the hinge arm 44, and extends upward from the hinge arm 44 and away from the support arm 16. The flange 15 is configured to receive an end of a first pneumatic actuator. The first pneumatic actuator can selectively extend and retract, causing each of the hinge arms 44 to pivot about respective linking pivot rod 48, and causing opposing hinge arms 44 of each opposing pair of gripping arms 12 to move relative to each other at pin 46, forming a hinged junction.

A flexible gripping element 30 is positioned at the end of the support arm 16, at, or near, the free end of the support arm 16 and away from the hinge arm 44. The flexible gripping element 30 is removably secured to the end of the support arm 16. As can be seen with reference to FIGS. 3-4, and 18, the flexible gripping element 30 may be a thick band, or bar shaped element, that is connected between the support arms 16 of the first bank of gripping arms on one side of the tool 10, with another flexible gripping element secured to, and extending between the support arms 16 of the second bank of gripping arms on the other side of the tool 10. In the shown embodiment, the flexible gripping element 30 is a bar shaped elastomeric material having a square cross-section profile and is removably attached to the support arms 16 of the first bank of gripping arms, with another corresponding flexible gripping element removably attached to the support arms 16 of the second bank of gripping arms. In particular, the flexible gripping element 30 is resiliently conformable, and may be in the form of an elastic material. In an embodiment, the gripping element 30 may be made from a rubber, silicon, polyurethane, or other elastomeric material capable of elastic deformation and recovery. It is contemplated that alternative shapes or profiles may be substituted and perform similarly, for example, the square shape profile of the bar depicted may instead be provided as a circular, rectangular, triangular, D-shaped, or oval cross-section profile; and/or may be provided with textural features such as grooves or protrusions in the profile or on the gripping element surface, especially that portion of the profile of the gripping element 30 facing the product, that can provide cushioning and/or improved grip against the surface of the material being gripped. The flexible gripping elements 30 are composed of materials that are chosen in keeping with the properties of the food product to be handled. As described above, the flexible gripping elements 30 are preferably made of a polymeric or elastomeric material. The flexible gripping elements 30 may be designed to be regularly cleaned and reused, or alternatively, to be replaced rather than to be cleaned and reused. In an embodiment, the flexible gripping element provides a non-porous exterior surface, such that it may be more easily cleaned, and will be resistant to collecting or retaining bacteria or mold, and avoid retention of particles, or food debris, such as may occur from repeated handling of a friable product.

Figure 18:
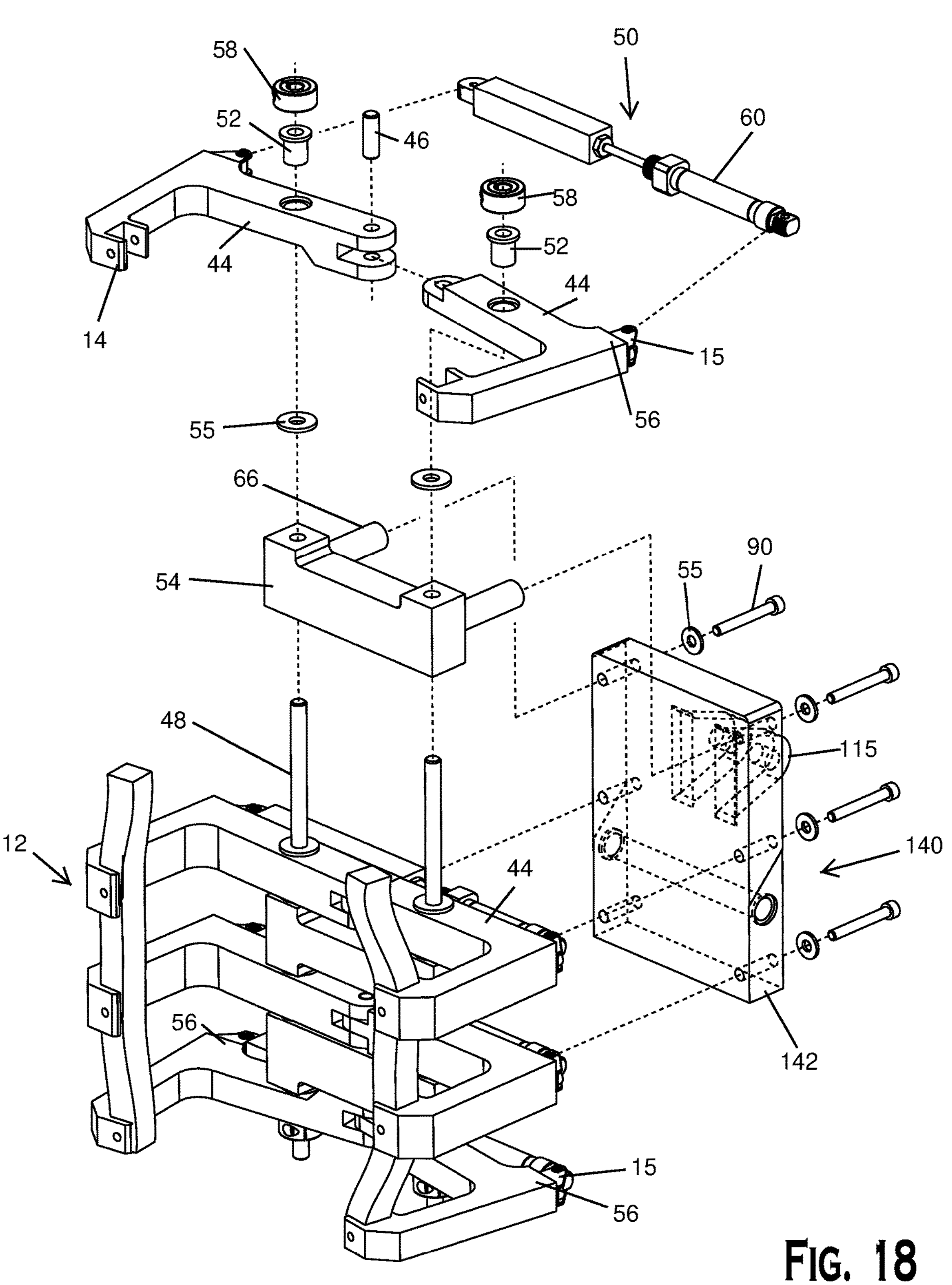
FIG. 18 is a partial exploded view of the components of the plurality of gripping arms and pivoting mount for the pivoting unit for an embodiment of the automated gripping tool according to the invention.

Details on the assembly of the plurality of gripping arms 12 can be seen with reference to the exploded parts view of FIG. 18. Each of the hinge arms 44 are mounted onto a linking pivot rod 48. The linking pivot rod 48 is directed through an opening near the middle of the length of the hinge arm 44. The linking pivot rod 48 may optionally be directed through a pivot bush 52 that fits into the opening into the hinge arm 44. Between adjacent opposing pairs of gipping arms on the linking pivot rod 48, there is provided a spacer 54, having a pair of openings to receive the linking pivot rod therethrough, and may optionally be provided with a washer 55 on the linking pivot rods, positioned on each side of the spacers 54. To maintain the hinge arms 44, spacers 54 and optional washer 55 components in position mounted on each respective linking pivot rod 48, there is provided a lock collar 58 near each end of the linking pivot rod 48. The lock collar can be releasably secured in position on the linking pivot rod 48, such as by tightening a set screw in the lock collar. The design and details for each of the lock collar, washers, and pivot bushes would be well familiar to those of ordinary skill in the relevant art.

As can be seen with reference to FIG. 18, for each corresponding gripping arm 12, the hinge arms 44 have a hinged end through which pin 46 is directed. The pair of hinge arms 44 (hereinafter collectively referred to as the "hinging unit" 40) articulate about the pin 46, as shown particularly in FIGS. 6, 7, 13, 14, 15, and 16 and as will be described in more detail below. The outer end of each of the pair of hinge arms 44 of the hinging unit 40 is mechanically connected to a linear actuator. For example, as shown in FIGS. 13-16, the outer end of each of the pair of hinge arms 44 may be coupled to a respective end of a pneumatic actuator 50, through the use of fasteners 90 and flange 15 respectively, such that expansive and contractive forces from the pneumatic actuator will be transmitted to the hinge arms 44 in order to effectuate the movement to allow controllably gripping and releasing of a product. The first pneumatic actuator 50 provides a pneumatic cylinder 60 that is in fluid communication with a source of pressurized gas 62, which, as will be understood by those of skill in the art, may be directed through one or more fluid lines and fittings, and with flow of the fluid controlled through valving, or actuation of a solenoid (not shown), with the solenoid actuation directed by an automation controller, such as with computer controlled operation. As depicted, the hinge arms of each hinging unit 40 are configured to have one hinged end portion reside against, or within, the hinged end portion of the opposing arm. Any suitable hinge method may be employed, and as shown, one of the hinge arms 44 may be provided with a pair of hinge knuckles that are configured to slidingly accept between them a single hinge knuckle of the opposing hinge arm 44, forming a hinged arrangement with interlocking knuckles that are pivotably secured to each other with pin 46. One skilled in the art will recognize that alternative hinged configurations are possible, and would behave similarly, in that the two hinge arms 44 of a hinging unit 40 would be capable of articulating movement, relative to each other at the hinge joint.

Each spacer 54 may be provided with a pair of mounting lugs 66 that extend perpendicularly away from the openings for the linking pivot rods 48, and with the use of a plurality of fasteners 90, allows the mechanical connection of the plurality of gripping arms 12 to the pivoting unit 140, described below.

Figure 7:
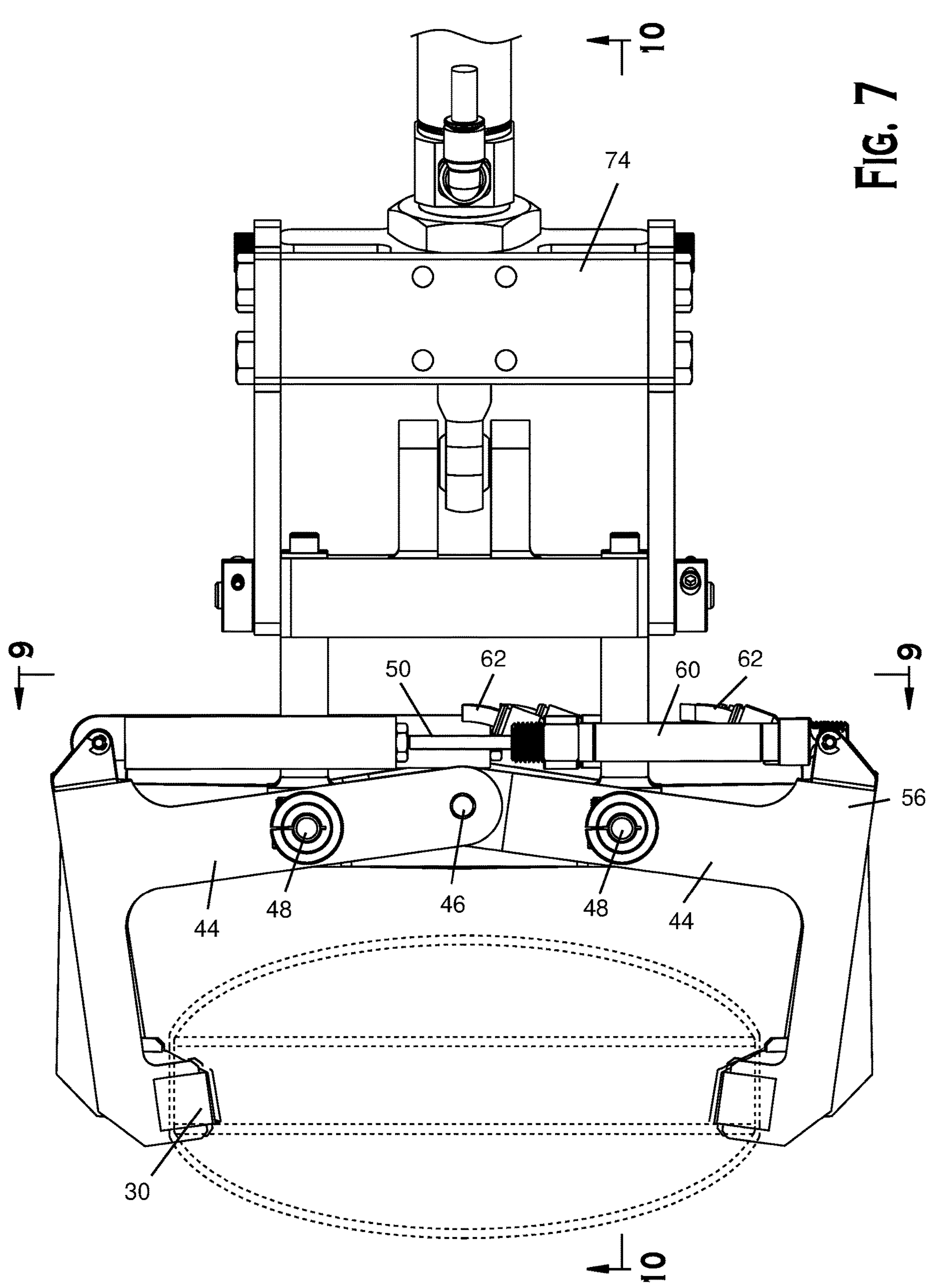
FIG. 7 is a side elevation view of the automated gripping tool of FIG. 3, only now in a closed grip position.
Figure 12:
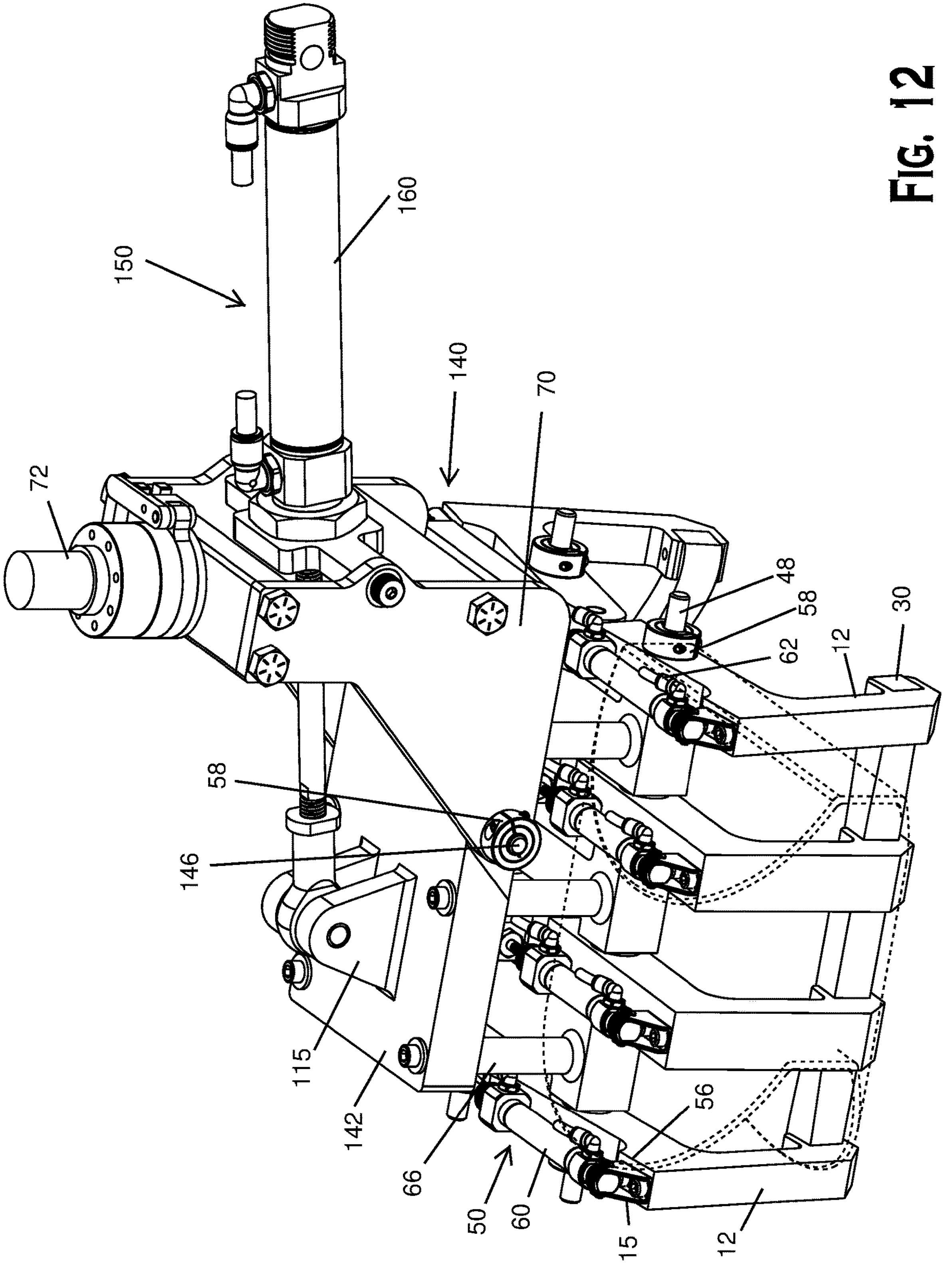
FIG. 12 is a side perspective view of the automated gripping tool of FIG. 11.

As shown in FIGS. 12 and 18, each pair of gripping arms 12 may be provided with a first pneumatic actuator 50. The first pneumatic actuator 50 may have a first pneumatic cylinder 60, and a piston rod. The pneumatic cylinder may be a double acting cylinder, in that direction of movement of the piston rod can be selectively actuated by directing increased pressure on either side of the piston reciprocated within the cylinder, thereby selectively extending or retracting the piston rod. A first end of the first pneumatic actuator 50 may be fastened to the flange 15 of a first hinge arm 44, and a second end may be fastened to the flange 15 of a second hinge arm 44. Retraction of the first pneumatic actuator 50, by causing the piston rod to be retracted into the pneumatic cylinder 60, as shown in FIG. 6, will result in the hinging unit 40 flexing at the hinge pin 46, as each hinge arm 44 is caused to pivot about the linking pivot rod 48 in a direction that causes each of the gripping elements 30 to be retracted away from the other opposite gripping element 30, and would provide a distance between gripping elements that exceeds the dimension of the food product. Conversely, extension of the pneumatic actuator 50, by causing the piston rod to be extended out of the pneumatic cylinder, as shown in FIG. 7, will result in the hinged arms flexing at the hinge pin 46, as each hinge arm is caused to pivot about the linking pivot rod 48 in a direction that causes each of the gripping elements 30 to approach the other gripping element and grip a food product between the gripping elements 30.

Figure 5:
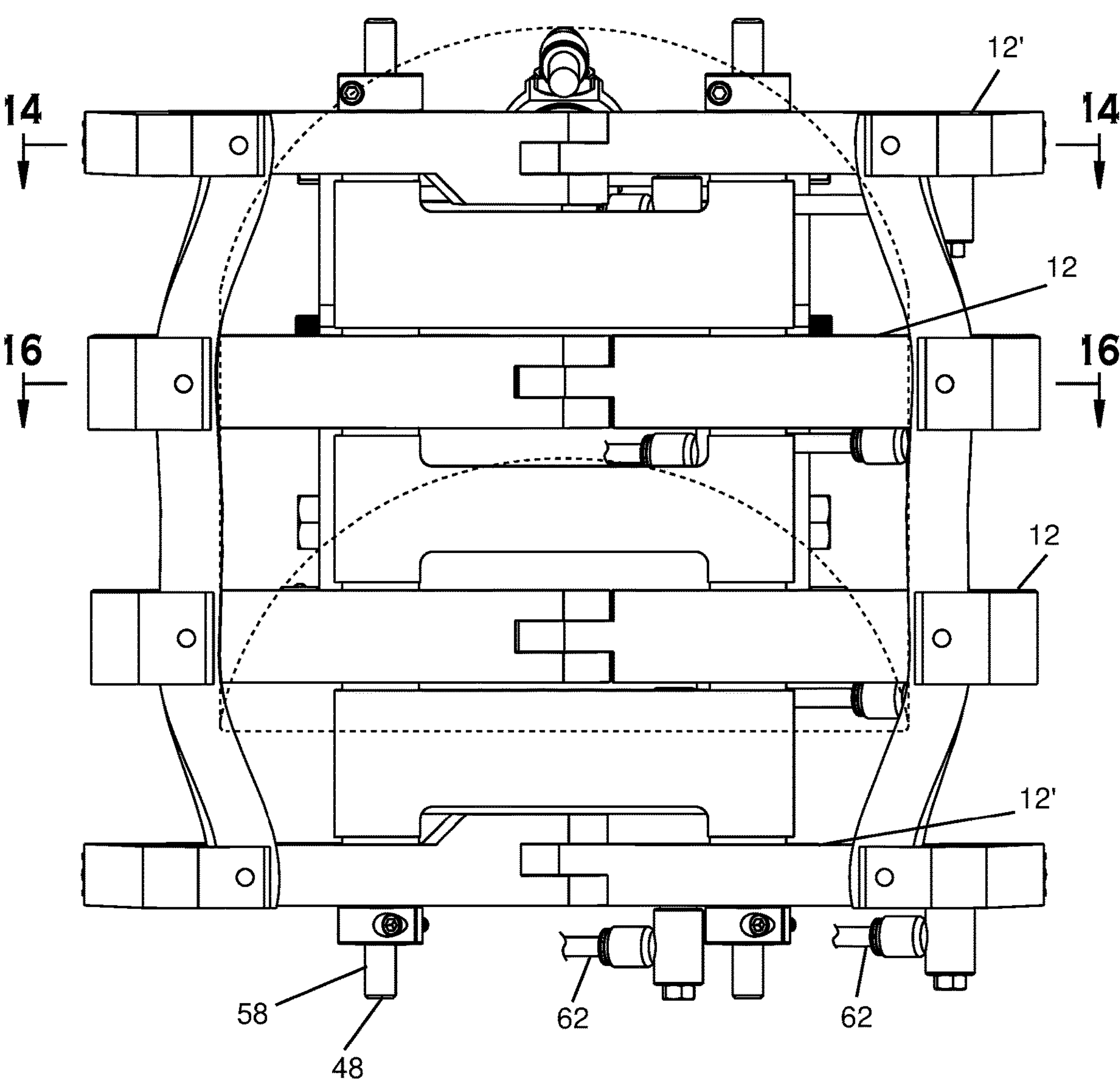
FIG. 5 is a bottom view of the automated gripping tool according to the invention, shown in a closed grip position.
Figure 9:
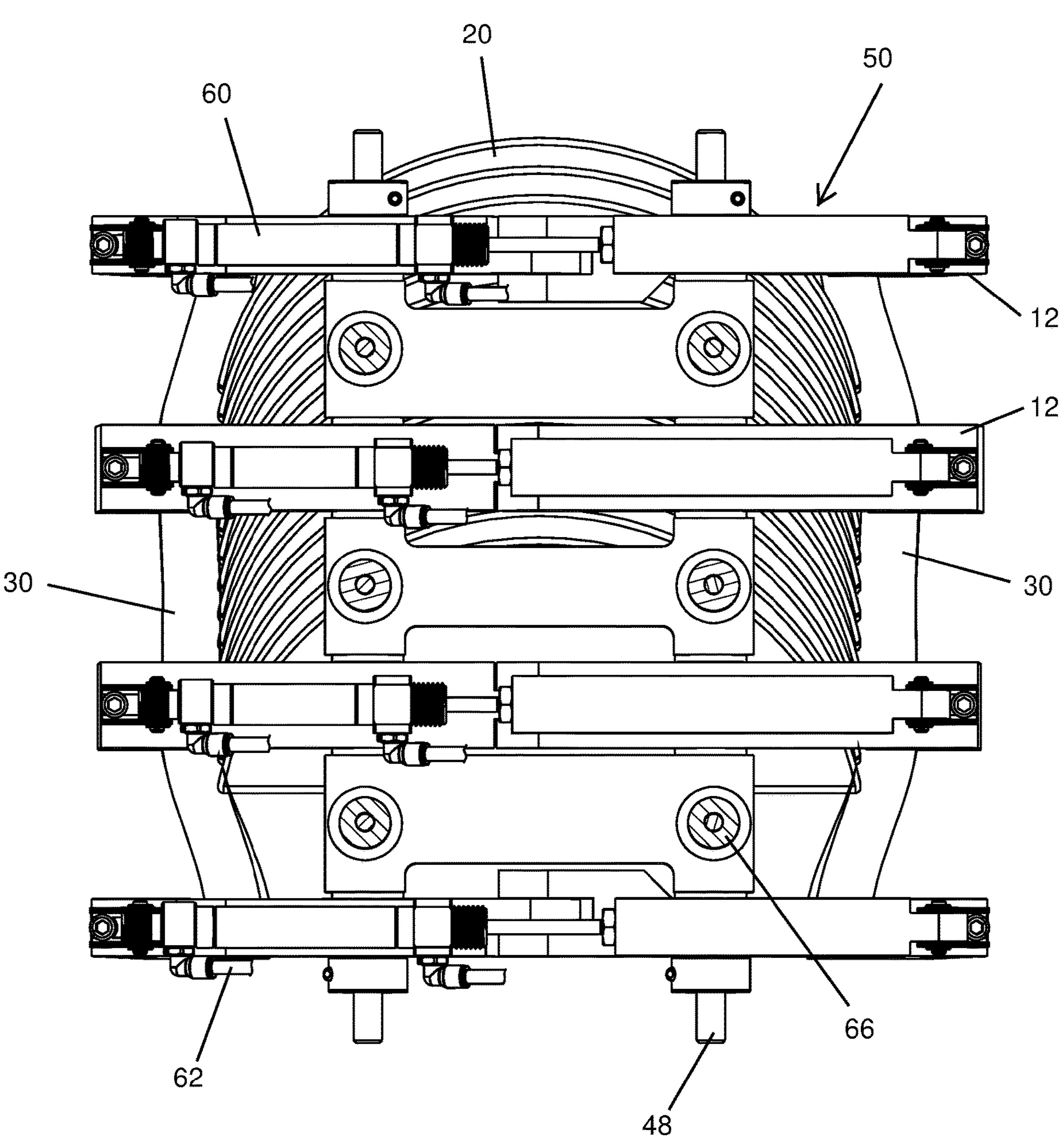
FIG. 9 is a top cross-section view of the automated gripping tool of FIG. 7, taken along line 9-9.
Figure 15:
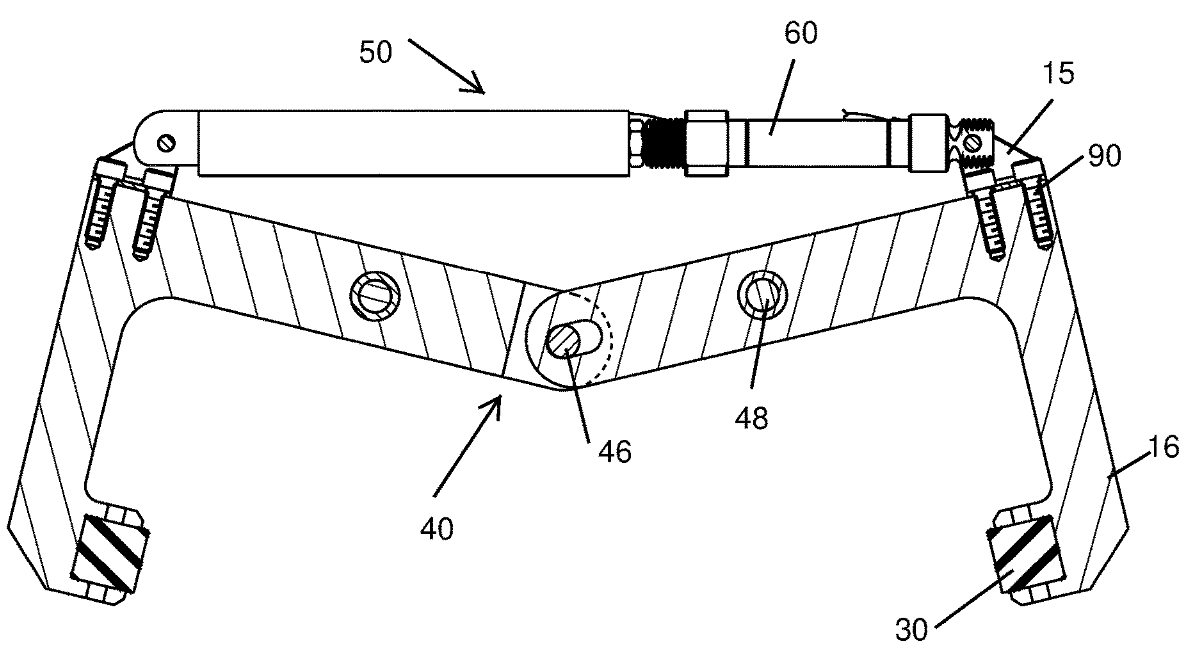
FIG. 15 is a cross-section view of corresponding gripping arms that are located away from the end of the plurality of gripping arms for the automated gripping tool of FIG. 4, depicting an open grip position, taken along line 15-15.
Figure 16:
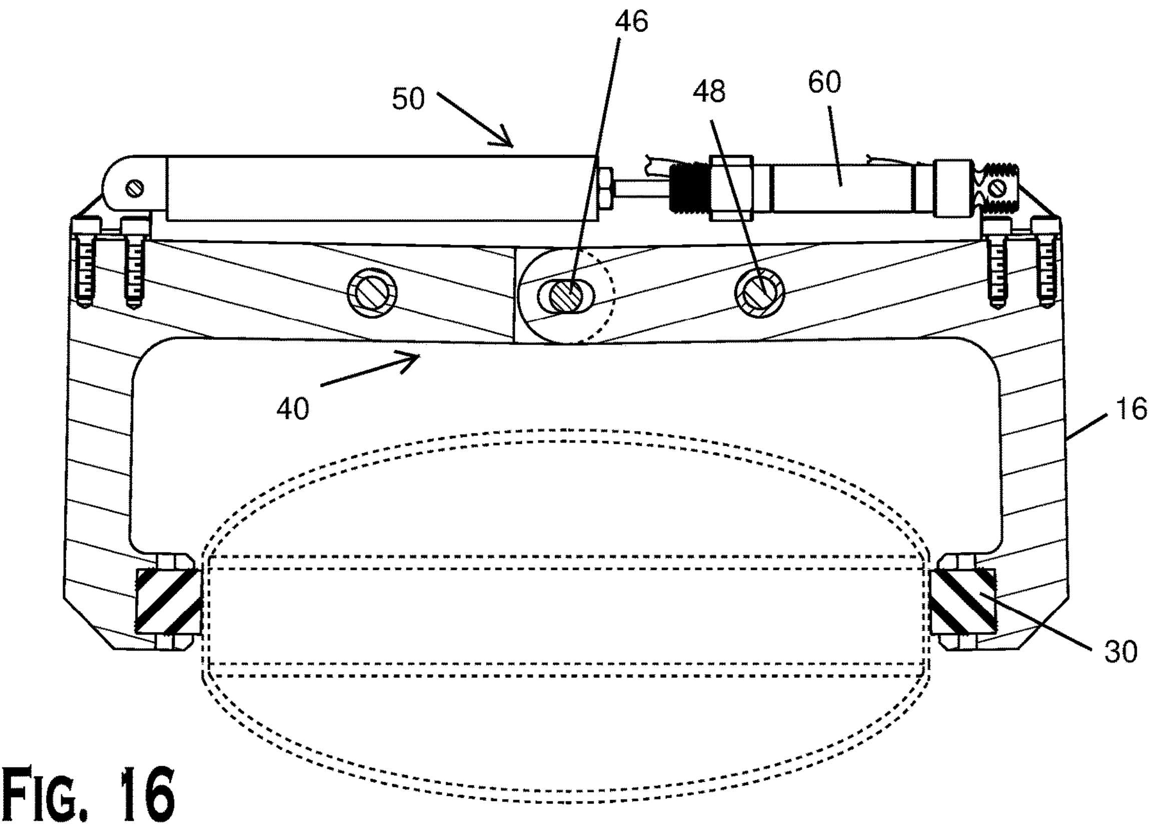
FIG. 16 is a cross-section view of corresponding gripping arms that are located away from the end of the plurality of gripping arms for the automated gripping tool of FIG. 5, depicting a closed grip position, taken along line 16-16.

In an embodiment, the gripping element 30 may be formed into a slightly curved shape when secured to the bank of gripping arms, and in this manner, may more securely cradle a food product when gripping the food product. It is also contemplated that in an alternative embodiment one or both of the gripping elements may be provided in a relatively straight orientation, as may be suitable for varying product shapes. Furthermore, the gripping elements 30 may feature a straight portion that aligns along the majority of the length of the product 20, but then has ends that are curved towards the centerline of the product 20. For example, a representative embodiment having a representative curvature of the opposing gripping elements 30, can be seen with reference to FIG. 1, and in greater detail in FIG. 9, and may be created by providing different geometries to the gripping arms and pneumatic actuators along the length of each bank of gripping arms 12 (e.g. a narrow grip opposing pair, and a wider grip opposing pair). For example, as shown, the outermost hinge arms 44' may be differently shaped than the rest of the hinge arms, as can be seen with reference to FIGS. 3, 8, and in detail in FIGS. 13-16. With reference to FIGS. 13 and 14, there is depicted a representative opposing pair of gripping arms 12' that provide a narrow grip when urged to the gripping position, as might be found at the outermost locations of the gripping arms (i.e., at the ends of each bank of gripping arms), or selectively utilized at any location along the bank of gripping arms where the opposing portions of the gripping elements need to be brought closer together (i.e., having a narrow closed grip) as may be necessary for gripping a variety of shaped products. FIG. 13 shows an exemplary opposing pair of gripping arms having a hinging unit 40 in a configuration that provides the gripping elements 30 at their maximum width dimension (i.e., in an open grip position) and providing a food product receiving space by having the pneumatic actuator 50 fully retracted. FIG. 14 is the same exemplary opposing pair of gripping arms 12', only now depicted with the hinging unit 40 in a configuration that provides the gripping elements 30 at their minimum width dimension (i.e., in a narrow closed grip position) and in a food product grasping configuration, by having the first pneumatic actuator 50 fully extended, by extending the piston rod out of the pneumatic cylinder 60. Note that, to provide the narrowed grip for this opposing pair of gripping arms 12', the flange 15 is secured to an elevated flange mount 56 provided on the end of the hinge arm 44, in the form of a raised portion of the hinge arm 44, above support arm 16. The additional height provided by the elevated flange mount 56 allows the first pneumatic actuator 50 to be fully extended and remain clear of the hinging unit 40 that is urged towards the actuator 50 due to the overextension. In contrast, FIGS. 15 and 16 depict opposing pairs of gripping arms 12, having a relatively wider closed grip than that just described, for example, as provided at the non-end position in the bank of gripping arms, or at any location of the bank of gripping arms where the opposing portions of the gripping elements need not be brought as close together (i.e., providing a wider closed grip) as may be necessary for gripping a variety of shaped products. FIG. 15 depicts the gripping arm 12 with the hinging unit 40 in a configuration that provides the gripping elements 30 at their maximum width dimension (i.e., in an open grip position) and providing a food product receiving space, by having the first pneumatic actuator 50 fully retracted. FIG. 16 depicts the same gripping arms 12, only now depicted with the hinging unit 40 in a configuration that provides the gripping elements 30 at their minimum width dimension (i.e., in a closed grip position) for a wider grip opposing pair of gripping arms, and positioned in a food product grasping configuration, by having the first pneumatic actuator 50 fully extended, by extending the piston rod out of the pneumatic cylinder 60. Note that the flange 15, as depicted, is secured to the end of the hinge arm 44 and, in contrast to the gripping arms of FIGS. 13 and 14, there is no elevated flange mount provided extending above the support arm 16. In operation, the elevated flange mount 56 of FIG. 14 will allow the use of a pneumatic actuator 50' mounted in a manner that can overextend the hinge unit that would cause the gripping arms 12', when in the closed grip position, to have a minimum width dimension that is slightly less than the minimum width dimension provided by the gripping arm 12 depicted in FIG. 16. In contrast, the gripping arms 12 as depicted in FIG. 16, when in the closed grip position, would not overextend the hinge unit, but rather remain generally aligned, thus providing a wider grip than that depicted in FIG. 14. In an embodiment, the minimum width of the narrow grip opposing arms may be reduced when compared to the minimum width of the wider grip opposing arms. For example, the narrow gripping arms, may provide a gripping dimension that is less than approximately 99%, or less than approximately 95%, or even less than approximately 92% of the minimum width of the wider grip gripping arms. In an embodiment, the width of a narrow grip for the gripping arms is approximately 90% of the width of a wider grip gripping arms. This can be seen by comparing the position of the gripping elements 30, relative to the product shown in phantom lines, in each of FIGS. 14 and 16. In this manner, for the exemplary embodiment depicted in FIGS. 5 and 9, the product 20 can be securely cradled within the opposing gripping elements 30, where the ends of the gripping elements are caused to be curved inwards towards a central axis. In the exemplary embodiment of FIGS. 5 and 9 depicting the gripping arms 12' at the outermost locations and being caused to extend further towards a central axis of the product 20, when compared to the other gripping arms 12. Note that the hinging unit 40 in FIG. 16 is configured with the hinge arms 44 to be in general alignment with each other horizontally; and in FIG. 14, the additional extension of the first pneumatic actuator 50', causes the hinge arms 44' to be flexed beyond position in which the hinge arms 44' are in horizontal alignment. The additional height of the elevated flange mount 56 prevents the first pneumatic actuator from interfering with the hinge unit 40 in the position depicted in FIG. 14.

Figure 1:
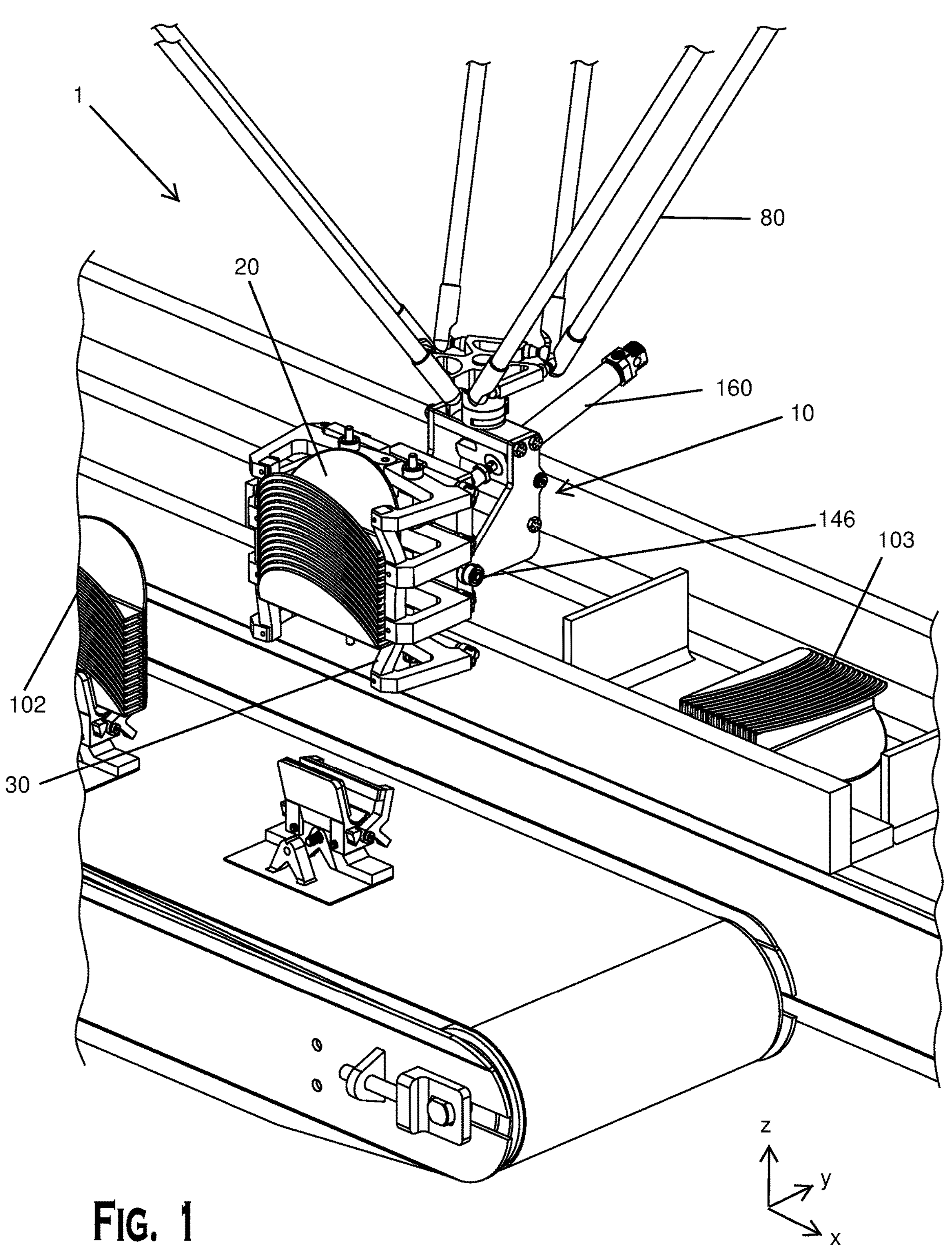
FIGS. 1 and 2 are a perspective view of an embodiment of an automated gripping tool according to the invention, shown in operation on a production and packaging line picking up and placing a stacked food product.
Figure 2:
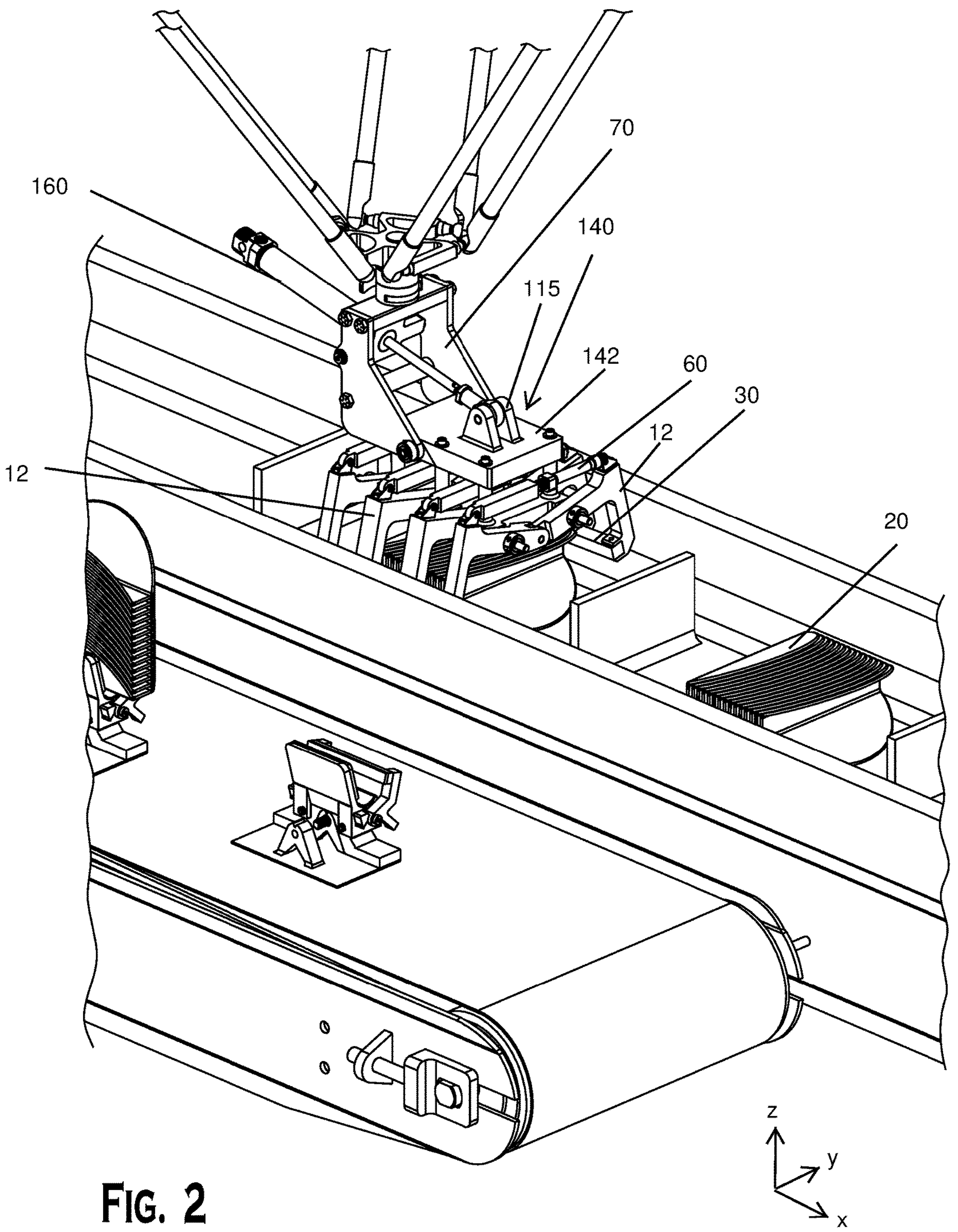
Figure 3:
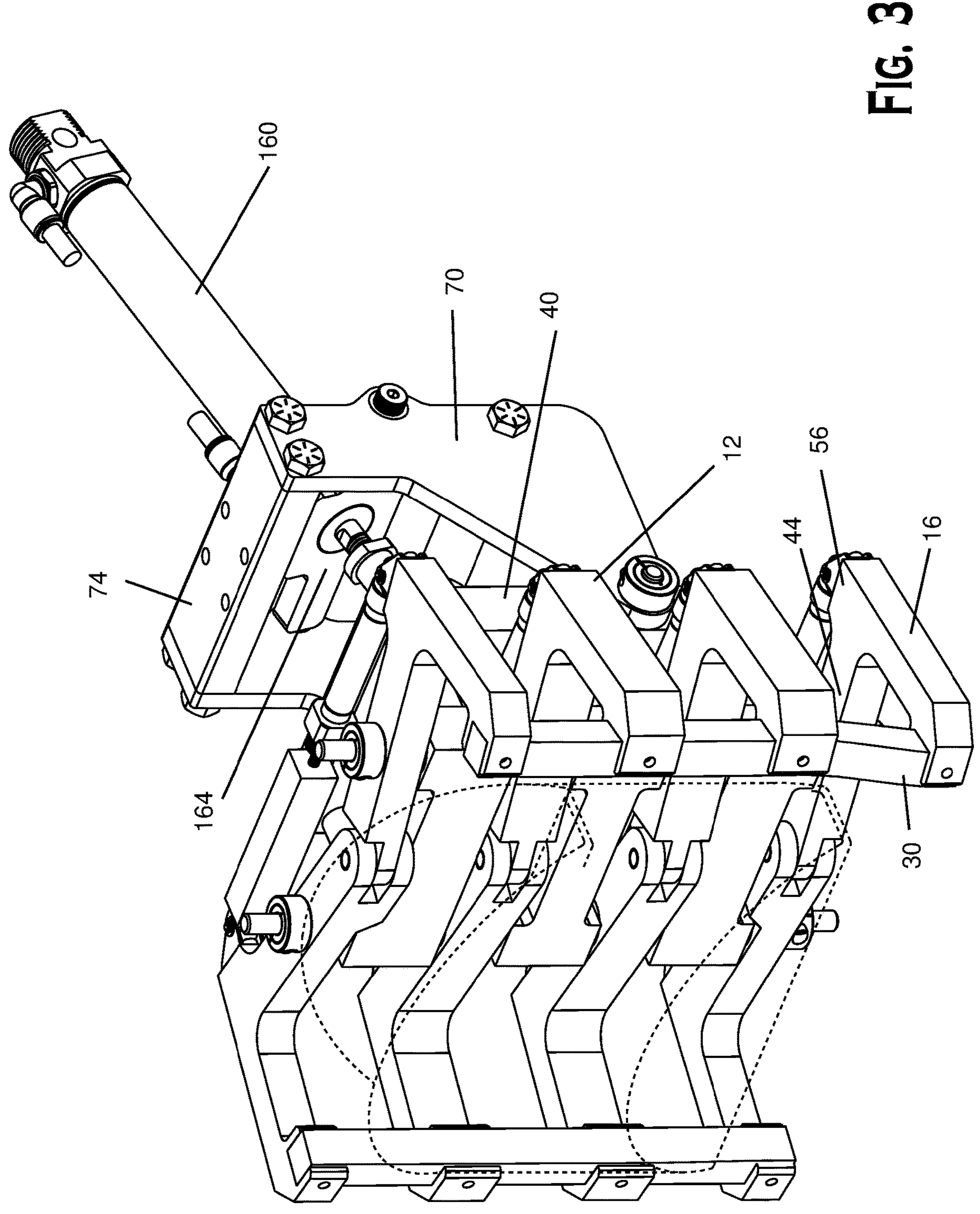
FIG. 3 is a perspective view of an automated gripping tool according to the invention, shown in an open grip position.

In an embodiment with curved gripping elements 30, for example, as shown in FIGS. 5 and 9, while in the closed grip position, the curve of the gripping elements 30 may conform around the product and thereby securely cradle the product, by narrowing the opening slightly at one or both ends of the gripping elements to partially encircle the product, and in this manner can facilitate securely gripping the product while the automated gripping tool 10 is being moved by the robotic arm 80, as will be discussed with reference to FIGS. 1 and 2.

It is contemplated that in alternative embodiments, the gripping arms 12 provided may be uniform along the length of the bank of gripping arms, such that the gripping elements 30 would generally remain straight and need not necessarily be curved inwards at either end. Alternatively, it is contemplated in another embodiment that just one of the pairs of gripping arms may be as shown in FIGS. 13 and 14, and thereby cause only one end of the gripping elements 30 to be curved inwards. One skilled in the art would understand that by selectively choosing which type of gripping arm to employ, or alternatively by further customizing the shape of the hinge arm 44 or support arm 16, the positioning of the gripping elements against the food product can be customized to suit the selected product.

With reference to FIGS. 12 and 18, the plurality of gripping arms 12 may be mechanically connected, for example, via mounting lugs 66, to the pivoting unit 140, providing a pivoting mount 142 and pivot rod 146. The pivot rod 146 may pivotably secure the pivoting mount 142 to the frame 70. The pivot rod 146, as can be seen with reference to FIG. 17, may be directed through a pair of openings in frame 70, optionally directed through bushes 52, and be secured in place within the frame 70 by a pair of lock collars 58, that can be secured against the pivot rod, and thereby prevent the pivot rod from shifting out of place, relative to the frame 70, as the pivoting mount 142 is reversibly caused to pivot, as will be described.

Figure 10:
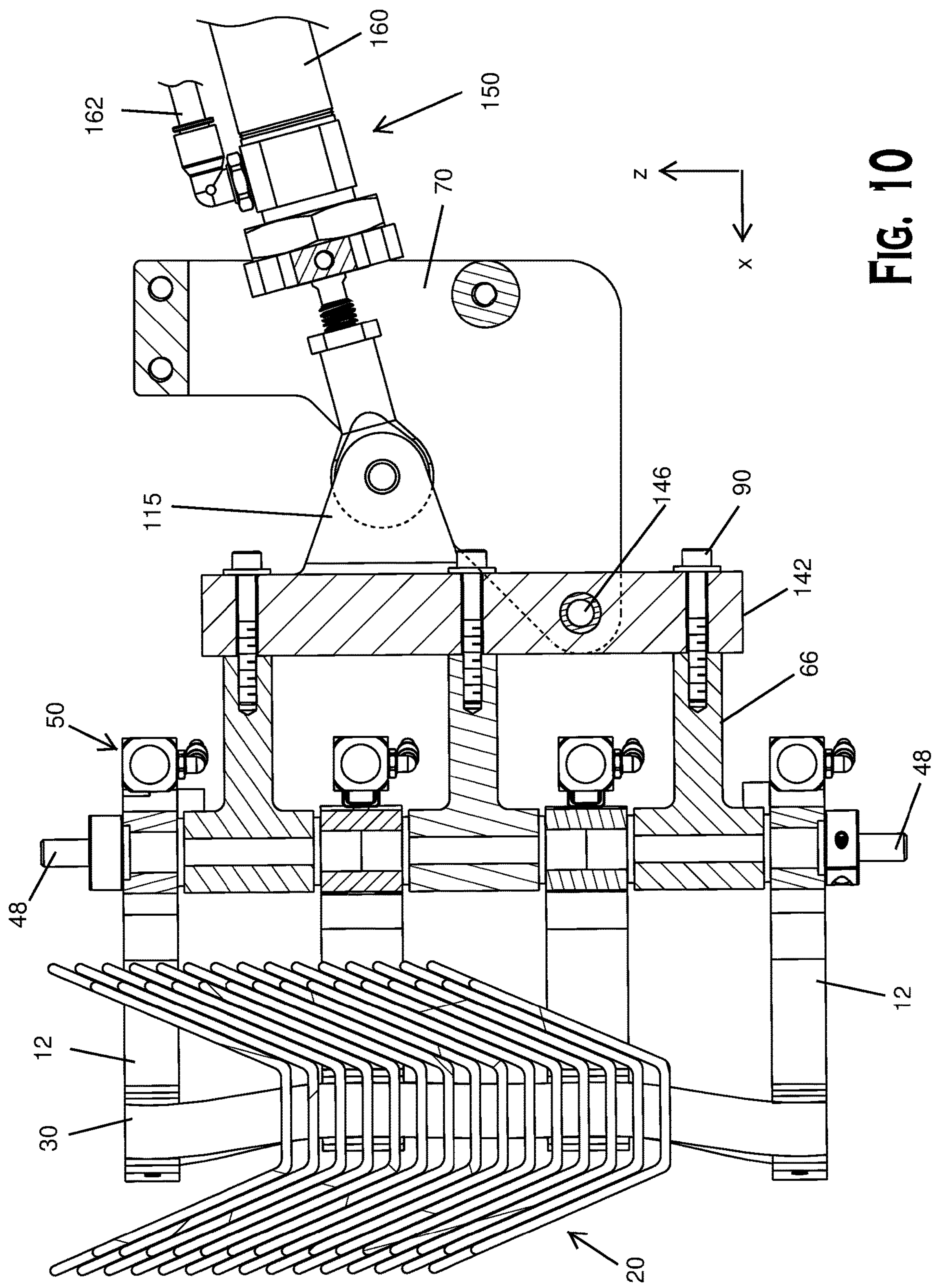
FIG. 10 is a side cross-section view of the automated gripping tool of FIG. 7, taking along line 10-10.
Figure 11:
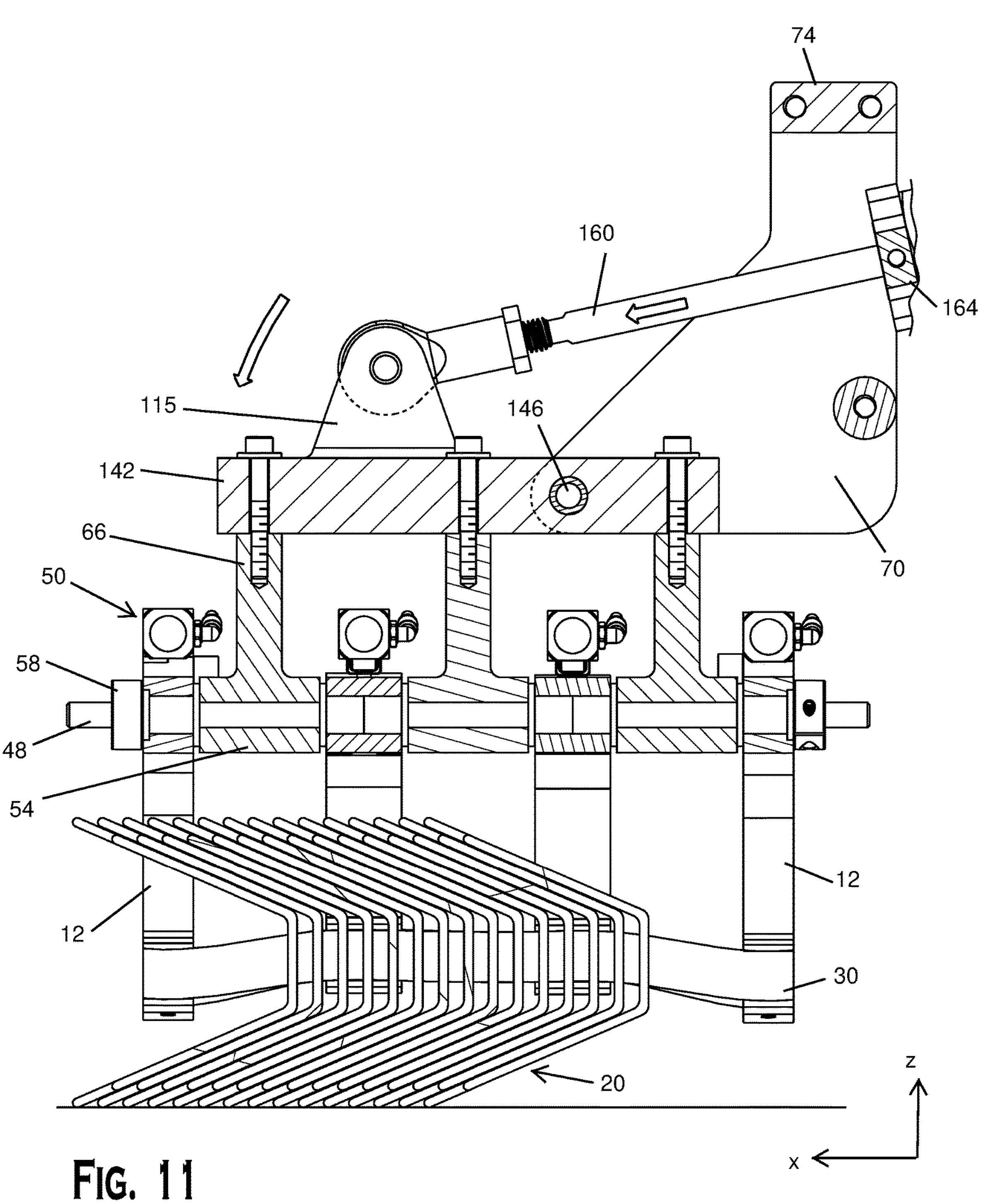
FIG. 11 is a side cross-section view of the automated gripping tool of FIG. 10, with the pneumatic cylinder for the pivoting unit having been actuated to change the orientation of the food product.

As can be seen with reference to FIGS. 10 and 11, the second pneumatic actuator 150 may be selectively actuated to cause the pivoting mount 142 to articulate about the pivot rod 146. As the plurality of gripping arms 12 are mechanically secured to the pivoting mount 142 by lugs 66 of the spacers 54, the orientation of the plurality of gripping arms 12 can thus be controlled by actuation or retraction of the second pneumatic actuator 150.

The second pneumatic actuator 150 may be a double acting cylinder, in that direction of movement of the piston rod can be selectively actuated by directing increased pressure on either side of the piston within the cylinder, thereby selectively extending or retracting the piston rod relative to the second pneumatic cylinder 160. The second pneumatic cylinder may be activated with pressurized gas 162, which, as will be understood by those of skill in the art, and may be directed by fluid flow through a valve or solenoid (not shown), with actions directed by an automation controller, such as with computer controlled operation, as will be familiar to those of skill in the art. The piston rod end of the second pneumatic actuator 150 may be mechanically secured to the pivoting mount 142. In an embodiment, the piston rod end of the second pneumatic actuator may be fastened to a flange 115 that is mechanically secured to the pivoting mount 142, as depicted in FIGS. 10 and 11. The pneumatic cylinder 160 of the second pneumatic actuator 150 may be secured to the frame 70, as depicted in FIG. 8, such that as the piston rod is extended, the pivoting mount 142 is urged into a horizontal configuration, as shown in FIG. 2 and in greater detail in FIG. 11. Conversely, when the piston rod of the second pneumatic actuator 150 is retracted, the pivoting mount is urged into a vertical orientation, as shown in FIG. 1 and in greater detail in FIG. 10.

Figure 17:
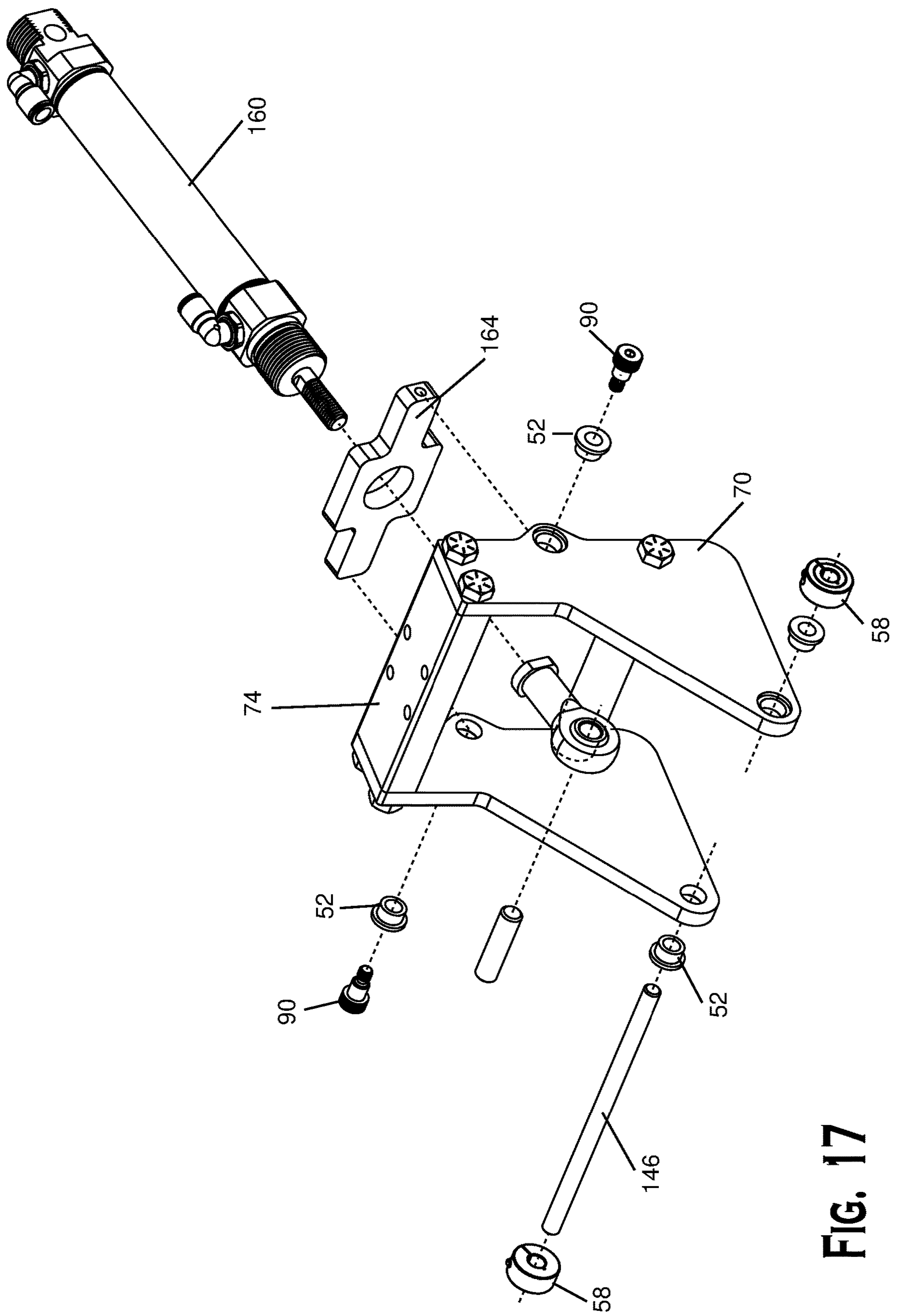
FIG. 17 is an exploded view of the components of the frame assembly and second pneumatic actuator for the pivoting unit for an embodiment of the automated gripping tool according to the invention.

With reference to FIG. 17, the second pneumatic cylinder 160 may be mounted to the frame 70, by being directed through opening in mounting plate 164. The portion of the second pneumatic cylinder directed through the mounting plate is secured in position in any suitable manner, such as through the use of a threaded connection to the mounting plate. The mounting plate 164 is secured to the frame 70 in any suitable fashion. As shown, mounting plate 164 is pivotably secured to the frame 70 by a pair of fasteners 90, which are optionally directed through bushes 52. In this manner, the second pneumatic actuator 150 may slightly pivot relative to the frame as the second pneumatic cylinder is caused to extend and retract, and the piston rod end may travel a non-linear, arced path as the pivoting mount 142 is moved between a first and second position by the connection of the piston rod end to flange 15 of the pivoting mount 142. It is contemplated that alternative mounting of the piston rod end can be employed to allow the piston rod end to follow a linear pattern of travel, while causing the pivoting mount 142 to pivot between the first and second positions, as will be familiar to those of skill in the art.

The frame 70 may have a stem receiving plate 74, for receiving stem 72 (shown in detail in FIG. 8) for connecting the automated gripping tool 10 to a robotic arm 80, as can be seen in FIG. 1. In an embodiment, the robotic arm 80 is capable of moving independently, or in combination, along axes X, Y, Z, thereby allows for horizontal and vertical movements and placement of the automated gripping tool 10 within a working range of the robotic arm 80. The robotic arm 80 may be any suitable unit known to those skilled in the art, such as gantry robots, articulated robots, linear robots, cylindrical robots, SCARA robots, multi-axis robots, or delta robots (as depicted in FIG. 1). As shown in FIGS. 1 and 2, the robotic arm 80 may be a commercially available stainless steel (IP69K rated) delta robot of the type sold by JLS Automation. In an embodiment, the robotic arm 80 may be positioned above the automated gripping tool 10. The robotic arm 80 utilizes a controller (not shown) which directs the actions of the robotic arm according to programmed instructions, as will be familiar to those of skill in the art. In the depicted embodiment, the robotic arm 80 is provided with an end of arm tooling component in the form of the automated gripping tool 10, which is secured to the robotic arm 80 at a robotic coupler through stem 72 that is reversibly received by the robotic arm 80. The robotic arm 80 thereby allows for controlled movement of the automated gripping tool 10 in multiple axes according to program instructions from the computer software controlling the robotic arm. The robotic arm may have movements directed by a controller, which may be the same or different controller than that directing the fluid flow for the first and second pneumatic actuators 50, 150, discussed above.

One of skill in the art will appreciate that other configurations are possible within the spirit of the invention.

As can be seen with reference to FIGS. 1 and 2, the automated gripping tool 10 is configured to move the food product 20 from a first position 102 to a second position 103 while maintaining the integrity and stacked configuration of the food product. When the integrity and appearance of the food product is retained, product waste is reduced. The first position 102 is generally in the last stage of the production process for the food product and the second position 103 generally is in a packaging or storage stage. The automated gripping tool 10 may additionally be used at other stages where its capabilities are advantageous. One of ordinary skill in the art is familiar with acceptable standards for integrity and appearance of food product.

The gripper tool 10 is designed to accommodate the dimensions of the food product to be handled. As shown in FIGS. 1-20, the plurality of gripping arms 12, as an exemplary embodiment, are designed to handle a food product that is a stack of items, for example, as shown in FIG. 1, the food product is a stack of shells that are stacked one within another. The embodiment depicted in FIGS. 1-16 is configured to grip, move, and/or reorient a taller stack of shells, and specifically as shown, 15 shells, utilizing four pairs of gripping arms. It is contemplated that a varying number of shells in the product can be accommodated, by adjusting the number of pairs of gripping arms in the tool 10, and/or adjusting the spacing between one or more of the pairs of gripping arms in the tool 10. It is contemplated that a tall stack, requiring four pairs of gripping arms would be 10 or more shells as a stack. Another exemplary embodiment is shown in FIGS. 19 and 20, where the plurality of gripping arms comprises just three opposing pairs of gripping arms 12, and the automated gripping tool 10, as shown, is configured to accommodate a food product, for example a food product provided as a shorter stack of shells, typically having less than 10 shells. The automated gripping tool 10 in the exemplary embodiment depicted in FIGS. 19 and 20 may be utilized to grip, move, and/or reorient a shorter stack, for example, one having less than 10 shells, and may have approximately 5 or 6 shells. In an embodiment, the plurality of flexible gripping elements 30 may be compliant and positioned so that they collectively grasp and conform against a food product along the length of the stack, and deter any pressure points that might cause breakage of the shells, which tend to be brittle.

Figure 4:
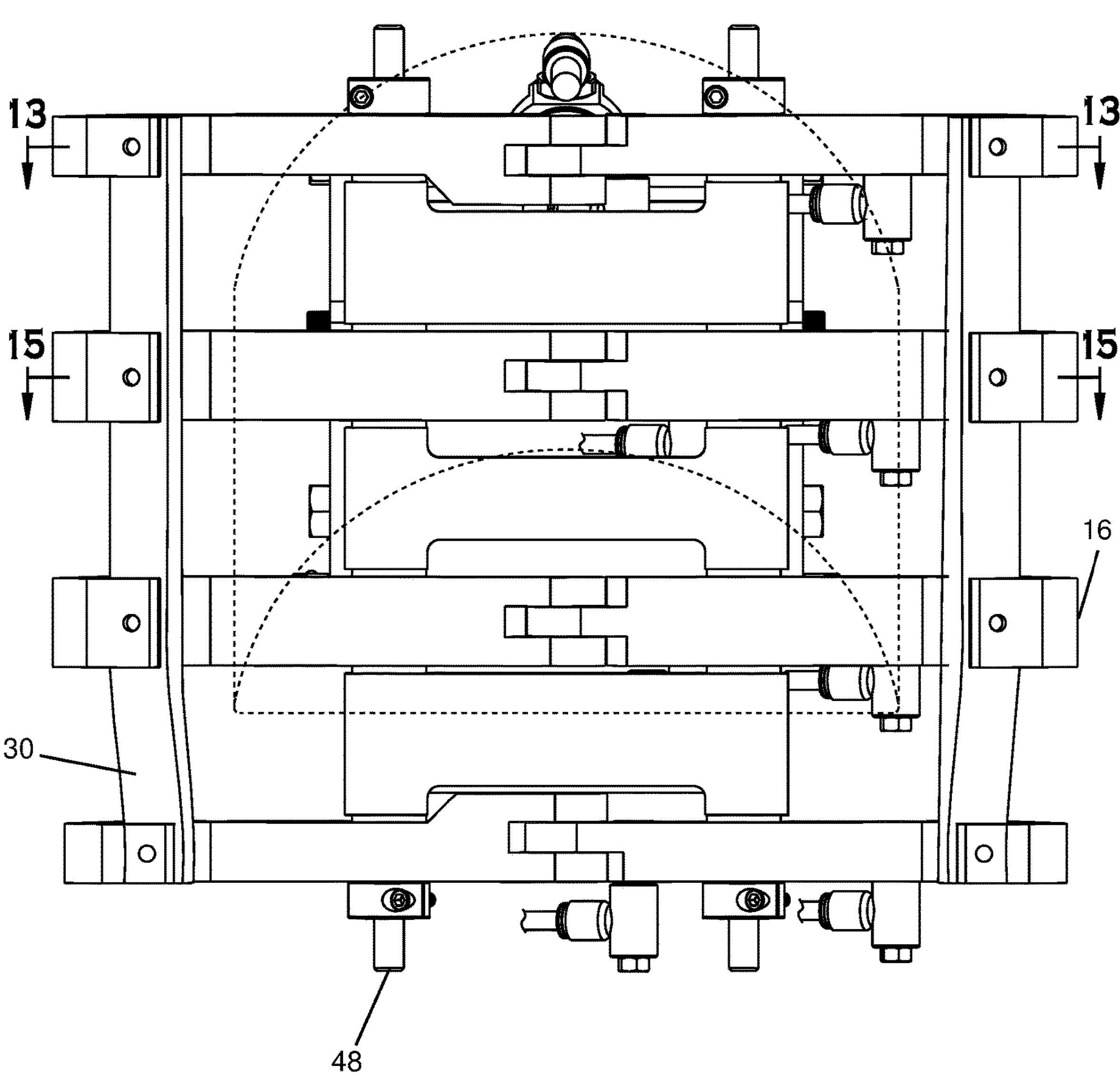
FIG. 4 is a bottom view of the automated gripping tool of FIG. 3.

In an embodiment, the automated gripping tool 10 provides elastically deformable gripping elements 30, that may be removably affixed to the gripping arms 12 of any of the embodiments of the automated gripping tool 10. In operation, the automated gripping tool 10 may be maneuvered by the robotic arm 80, to place the gripping tool in the vicinity of the food product 20, with the flexible gripping elements positioned alongside the stacked food product, as shown in FIG. 10. In order to grasp and maneuver the food product, the automated gripping tool may initially be provided with the actuators for the gripping arms 12 in a retracted position, such that the automated gripping tool 10 is urged into an open grip position (as shown in FIG. 4 or 6), characterized by having the spacing between the opposing gripping elements 30 for each of the opposing banks of gripping arms 12 exceeding the width dimension of the stacked food product 20. To grasp the food product 20, the gripping elements 30 for each of the banks of opposing gripping arms 12 may be moved towards each other upon actuation of the first pneumatic cylinders 60, to extend the piston rod out from the first pneumatic cylinder 60, for each of the pair of gripping arms 12, thereby bringing the gripping elements 30 into contact with the food product 20, and cradling the food product between the flexible gripping elements 30, as shown in FIG. 5 or 7, depicting the gripping arms 12 in a closed grip position. Sufficient force may be applied in the closed grip position, such that the food product 20 is securely cradled between the gripping elements 30, and the food product may remain securely restrained in the gripping elements, even while the robotic arm is maneuvered, or the pivoting unit is actuated. More particularly, the gripping elements 30 may be brought towards each other with sufficient force to allow the automated gripping tool 10 to securely grip the food product, and cause the gripping elements 30 to conform against the food product 20, without causing breakage of the food product. Moreover, as the opposing gripping elements 30 are brought towards each other into the closed grip position, there is a tendency for any items in the food product stack that may be out of alignment to be slidingly brought into alignment with the other elements of the food product stack, thus the automated gripping tool 10 can overcome some variance in the alignment of product within a stack, so long as the extent of misalignment does not exceed the tolerance afforded by the automated gripping tool's open grip position. Since the flexible gripping elements 30 are elastically conformable, they conform to the shape and size of the food product 20 in a way that exerts a uniform load across the side dimensions of the food product stack. This uniformity of load across the side of the food product 20 prevents stress concentration and can thereby serve to preserve the integrity and appearance of the food product, and avoid breakage. This invention thus is an improvement in the handling of fragile stacked food products, in contrast to the known art that uses "fingers" applied directly against a food product, where each "finger" exerts a localized point of pressure on the food product, which could potentially result in concentrated stress and damage to a fragile stacked food product. As shown in the embodiment of FIGS. 1-16, the flexible gripping elements 30 may be generally bar shaped and may be caused to conform to the alignment of the ends of the respective bank of gripping arms 12. In an embodiment, the flexible gripping elements may be square or rectangular cross-section and may have a length that is equal to or exceeds the length of the gripped dimension of the food product. As shown in exploded perspective view of FIG. 18, the flexible gripping elements 30 may be secured to the gripping arms 12 through the use of one or more fasteners or other suitable retaining elements positioned at each end of each support arm 16. In an embodiment, the fastener for retaining the gripping element 30 within each gripping arm 12 may be inserted through an opening provided in the fingers 14 into which the flexible gripping elements 30 are inserted. Alternatively, the elastically conformable nature of the gripping element 30 may allow it to be forced or squeezed into the fingers on the vertical support, optionally having a retaining feature, such as a protrusion that may serve to engage against the gripping element, and thereby retain the gripping element within the fingers. In an embodiment, the gripping element is restrained by friction within the fingers of the gripping arms. For example, the gripping element may seek to return to its non-stressed state, and is thereby urged against the inside features of the fingers to thereby retain its position. In an embodiment, the gripping elements are restrained by mechanical engagement. In an embodiment, the gripping element may feature a securement element provided on, or affixed to the body of the gripping element, such as by adhering a securement element in the form of a rigid tab to the body of the gripping element. In this embodiment, the securement element may be in the form of a tab configured to engage or be mechanically secured to the fingers 14. In an embodiment, the tab is mechanically secured through the use of one or more fasteners, or engagement elements, such as hook features that receive a portion of the tab. Such a securement element may be of the same material, or different material as the body of the gipping element. In an embodiment, the securement element may be a metal tab that is secured to the gripping element, and the metal tab has an opening for providing a fastener, such as a screw therethrough to secure the tab to each gripping arm, such as to the fingers 14 of the gripping arm 12. In any configuration, the gripping element 30 is configured to be retained securely on the ends of the arms of the gripping tool as the gripping tool is maneuvered to manipulate and/or move the product 20. The fingers 14 for receipt of the flexible gripping elements 30 may be any suitable material, such as plastic or metal, that secure the flexible gripping elements 30 during operation and yet permit the gripping elements 30 to be replaced as needed.

In an embodiment, the flexible gripping elements 30 may be removably attached to the gripping arms 12 to permit removal and/or replacement, such as may be required for maintenance, for sanitary and hygienic purposes, or to permit the use of an alternate design of the flexible gripping element 30.

FIG. 9 shows how the gripping arms 12 with removably secured elastic gripping elements 30 are useful in handling food products 20 provided as stacked items, where the gripping elements can be seen to cradle the food product. FIG. 9 is a top-down section view of an embodiment of the automated gripping tool 10, from a section view taken along a plane positioned below the pivoting unit 140, and above the gripping arms 12, and shows a stacked food product 20 comprised of a plurality of taco shells, that are each brittle and susceptible to breakage if there is a stress concentration when being gripped. As shown, the elastically conformable gripping elements 30 can be seen to cradle the stacked food product 20, by being slightly curved towards the centerline of the stacked food product at the ends of each of the gripping elements 30, but also, the gripping elements are caused to conform against, and gently secure the food product around the side dimensions of the stacked product, as can be seen in the cross-section view of FIG. 10, where the gripping element 30 is seen to be applied against the mid-line of the stacked food product 20.

FIGS. 10 and 11 show the action of the second pneumatic cylinder 150 in effecting the reorienting of the stacked food product 20, by causing the pivoting unit 140 to vary between a horizontal and vertical alignment. Thus, the automated gripping tool 10 can accommodate picking up and handling of a product that is provided in a first position 102, and transporting the product to a second position 103. For example, where the product is initially provided to the first position 102, and in an exemplary embodiment, is initially provided in an orientation that is a vertical stack of food product, though it is contemplated that in an alternative embodiment, the first position 102 may have the product provided in a horizontal stack of food product. The automated gripping tool 10 can accommodate placing the product in a second position 103, where the food product will be placed in an alignment that is the same, or different from the initial orientation of the stacked food product in the first position 102. With reference to FIGS. 1 and 2, the robotic arm 80 and automated gripping tool 10 can be seen to pick up a food product 20 that is stacked vertically from a first position 102, located on a first conveyor. The automated gripping tool 10 after having picked up the product, may then reorient the food product stack to a horizontal orientation, by pivoting the pivoting mount 142 with the actuation of the second pneumatic actuator 150, and can be seen in FIG. 2, whereupon the automated gripping tool may then release the grip on the food product 20, such that the food product is placed in a second position 103 on a different conveyor. Control of placement and pickup location and programming will be familiar to those of skill in the art of automated processing systems. The determination of the pick-up and placement orientation of the stacked food product 20 may be determined by the user for the particular manufacturing process, and equipment provided for further processing or packaging of the food product.

An alternative embodiment of an automated gripping tool 10 is depicted in FIGS. 19 and 20, which differs from the previously described embodiment in the number of pairs of gripping arms 12 provided. As shown, there are three pairs of gripping arms, which are spaced apart by spacers 54, and connected to a pivoting mount 142. As described, by varying the number of pairs of gripping arms 12, and optionally by varying the spacing between each of the pairs of gripping arms 12, along with the dimensions of the gripping tool 10, one skilled in the art would be able to modify the automated gripping tool 10 to suit the desired dimensions for a stacked and/or fragile product that is to be repositioned. For example, the embodiment depicted in FIGS. 19 and 20 may be employed to grip, move and/or reorient a stacked food product 20 of lesser dimension than that depicted in FIG. 1, for example to reposition a stacked product having between 3 and 9 taco shells. As with the previous embodiment, the gripping elements 30 would be configured to cradle the length of the stacked product, by being curved inwards at the ends of the gripping element 30, to securely grip the food product 20 without breaking the brittle food product material as the food product 20 is moved by the automated gripping tool 10 and the robotic arm 80 between a first position 102 and a second position 103.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles “a” and “an” preceding an element or component of the invention are intended to be nonrestrictive regarding the number of instances, that is, occurrences of the element or component. Therefore “a” or “an” should be read to include one or at least one, and the singular word form of the element or component also includes the plural unless the number is obviously meant to be singular.

The term “invention” or “present invention” as used herein is a non-limiting term and is not intended to refer to any single embodiment of the particular invention but encompasses all possible embodiments as described in the application.

What is claimed is:

1. An automated gripping tool for grasping a food product, comprising:
- a pivoting unit;
- a frame supporting the pivoting unit; and
- a plurality of corresponding gripping arms mechanically secured to the pivoting unit, and positioned apart to provide a food product receiving space, each of the corresponding gripping arms having:
- a hinging unit having a first hinge arm and a second hinge arm connected by a pin that is positioned about a pivot point of the hinge;
- a first support arm connected to one end of the first hinge arm and extending away from the first hinge arm;
  - a second support arm connected to an end of the second hinge arm and extending away from the second hinge arm;
- a first flexible gripping element positioned between and secured to the first support arm for the plurality of corresponding gripping arms; and
- a second flexible gripping element positioned between and secured to the second support arm for the plurality of corresponding gripping arms, the pivoting unit provides the plurality of corresponding gripping arms to uniformly move in a vertical configuration and a horizontal configuration.

2. The automated gripping tool of claim 1, wherein the first flexible gripping element and the second flexible gripping element are a resilient material selected from rubber, silicon, polyurethane, and combinations thereof.

3. The automated gripping tool of claim 2, wherein the first flexible gripping element and second flexible gripping element are each a bar shaped material having a rectangular cross-section profile.

4. The automated gripping tool of claim 3, wherein the first flexible gripping element is removably attached and extends between a first bank of corresponding gripping arms on a first side of the food product receiving space, and the second flexible gripping element is removably attached and extends between a second bank of corresponding gripping arms on a second side of the food product receiving space.

5. The automated gripping tool of claim 1, wherein each of the corresponding gripping arms further include a first pneumatic actuator that reversibly rotates the first hinge arm and the second hinge arm, whereby each of the corresponding gripping arms can be selectively moved between an open grip position and a closed grip position.

6. The automated gripping tool of claim 5, wherein at least one of the corresponding gripping arms has a hinging unit positioned with the first hinge arm and the second hinge arm in linear alignment when the first pneumatic actuator is extended.

7. The automated gripping tool of claim 5, wherein at least one of the corresponding gripping arms includes an elevated flange mount on each of the first hinge arm and the second hinge arm.

8. The automated gripping tool of claim 7, wherein the at least one corresponding gripping arms with the elevated flange mount is at an end position of the plurality of corresponding gripping arms.

9. The automated gripping tool of claim 8, wherein at least one of the corresponding gripping arms has the first pneumatic actuator spaced away from the first hinge arm and second hinge arm by the elevated flange mount to vertically offset the first pneumatic actuator above the hinging unit, such that when the first pneumatic actuator is extended, the hinging unit can be positioned with the first hinge arm and the second hinge arm overextended at an angle that exceeds 180 degrees.

10. The automated gripping tool of claim 8, where in a portion of the food receiving space defined between the corresponding gripping arms with the elevated flange mount is less than another portion of the food receiving space between the corresponding gripping arms that lack the elevated flange mount, when the respective first pneumatic actuators are extended.

11. The automated gripping tool of claim 10, wherein the first gripping element and the second gripping element are configured to cradle the food product.

12. The automated gripping tool of claim 1, wherein the pivoting unit includes a pivoting mount supporting the plurality of corresponding gripping arms.

13. The automated gripping tool of claim 12, wherein the pivoting unit further includes a pivot rod upon which the pivoting mount may rotate.

14. The automated gripping tool of claim 13, wherein the pivoting unit further includes a second pneumatic actuator that can controllably affect the rotation of the pivoting mount as the second pneumatic actuator is reversibly actuated.

15. The automated gripping tool of claim 14, wherein the pivot rod is extended through the pivoting mount and the frame, such that the pivoting mount can rotate about the pivot rod, and pivot relative to the frame in response to the reversible actuation of the second pneumatic actuator.

16. The automated gripping tool of claim 15, wherein the pivoting mount is mechanically secured to the plurality of gripping arms, such that as the pivoting mount is caused to rotate about the pivot rod, the plurality of gripping arms are caused to rotate approximately 90 degrees.

17. The automated gripping tool of claim 1, wherein the frame is secured to a robotic arm.

18. The automated gripping tool of claim 1, wherein the plurality of corresponding gripping arms comprises four pairs of corresponding gripping arms.

* * * * *